INVENTOR.
Carl F. Rauen,
BY
Hood + Hahn.
ATTORNEYS

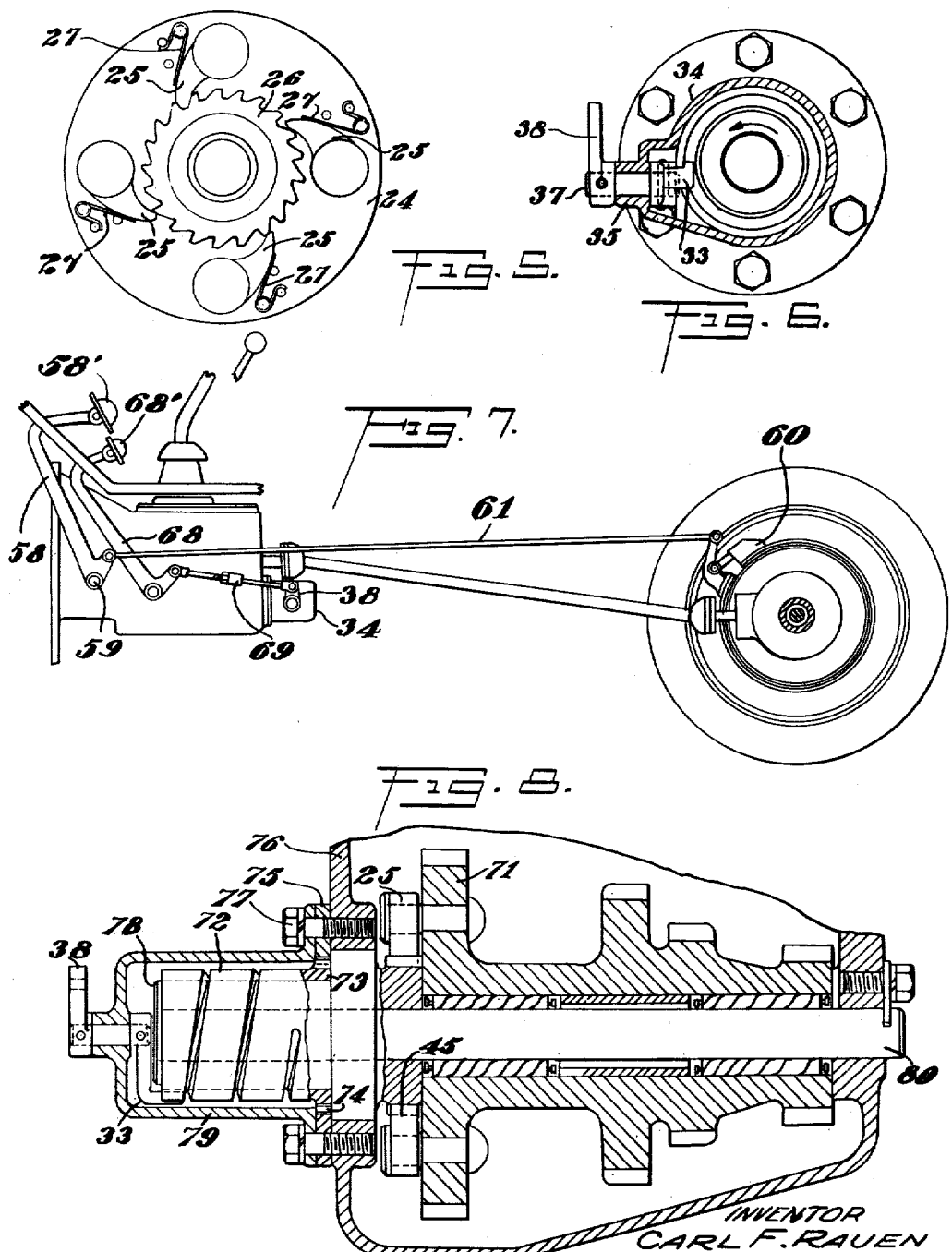

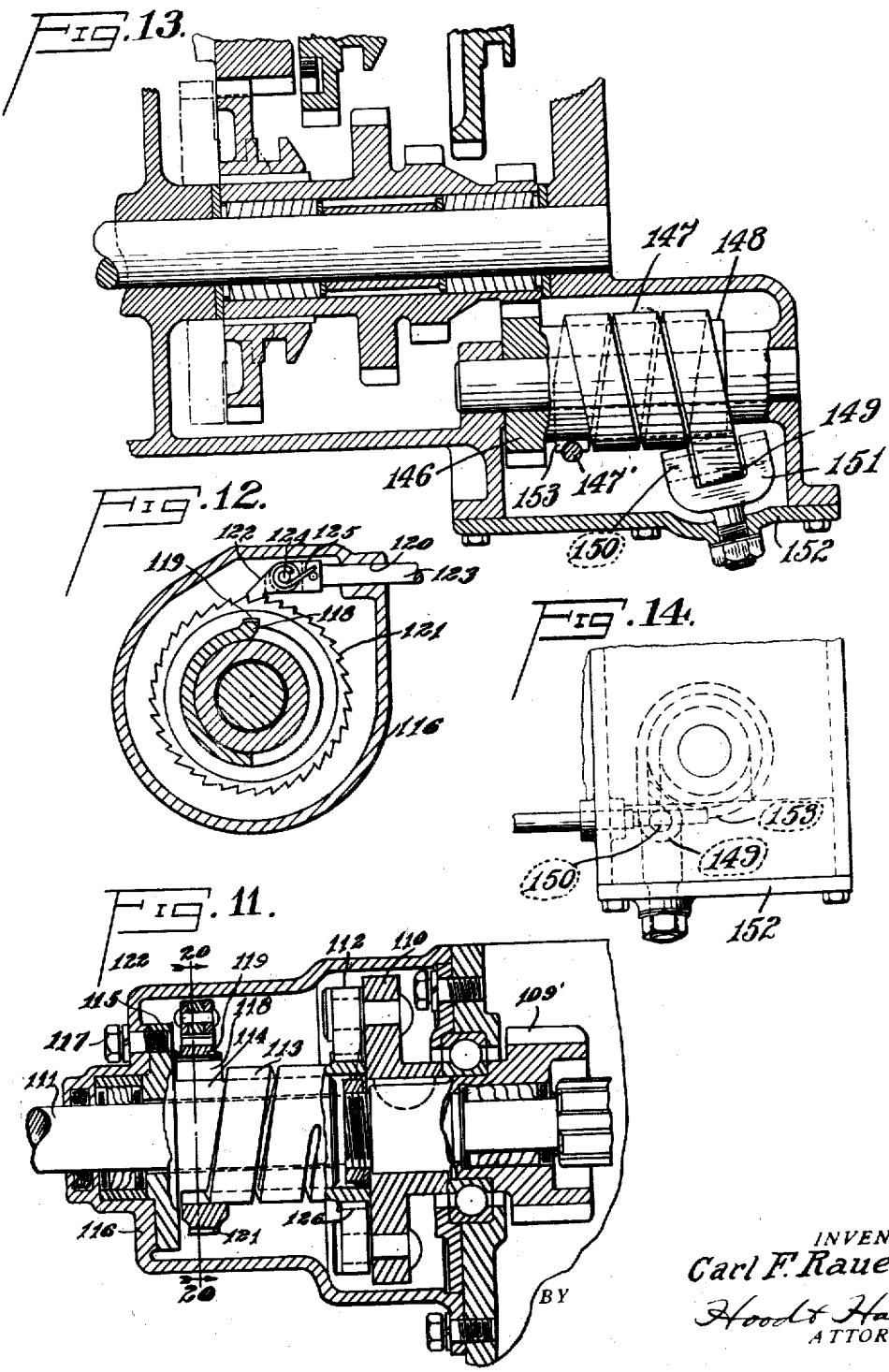

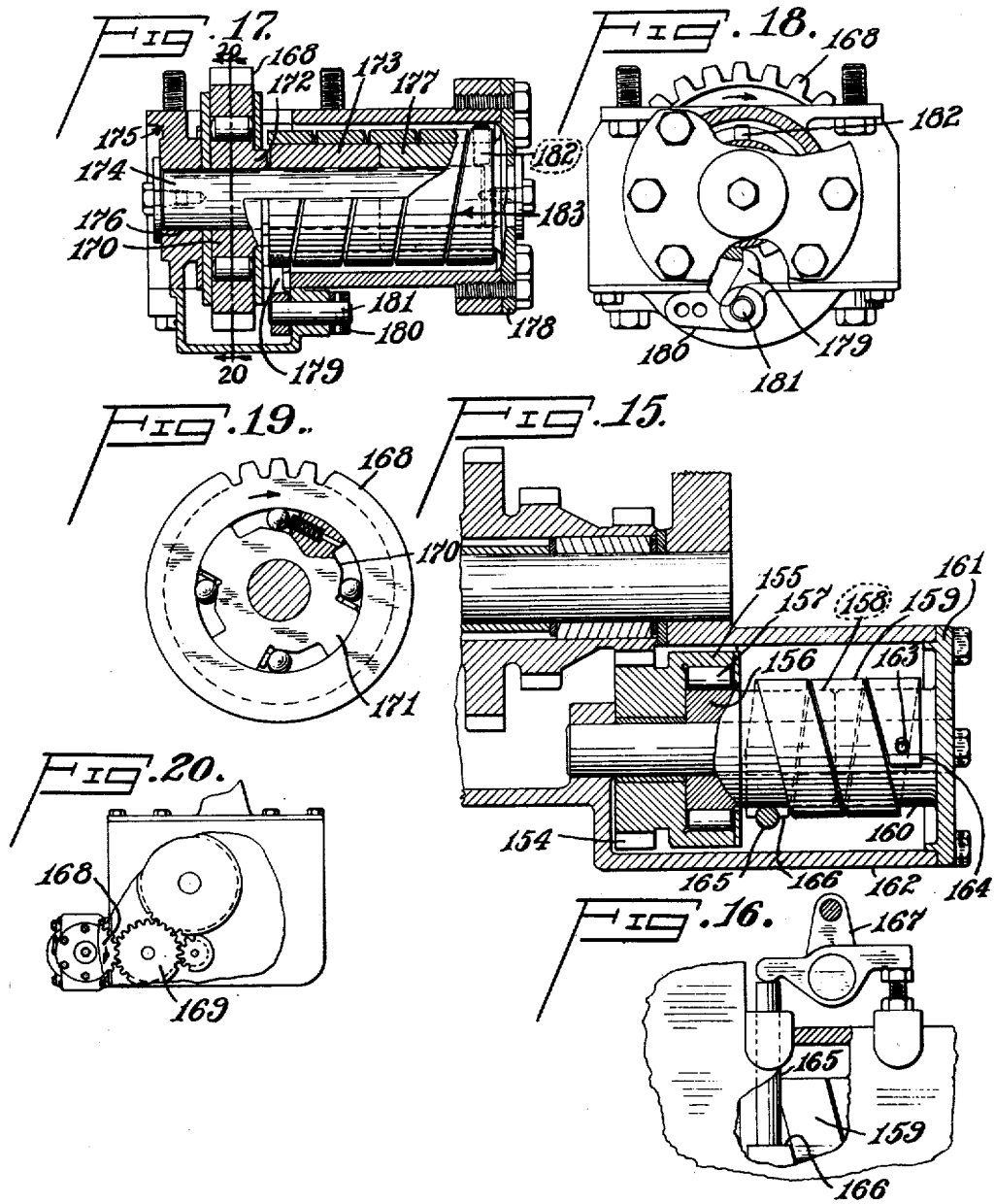

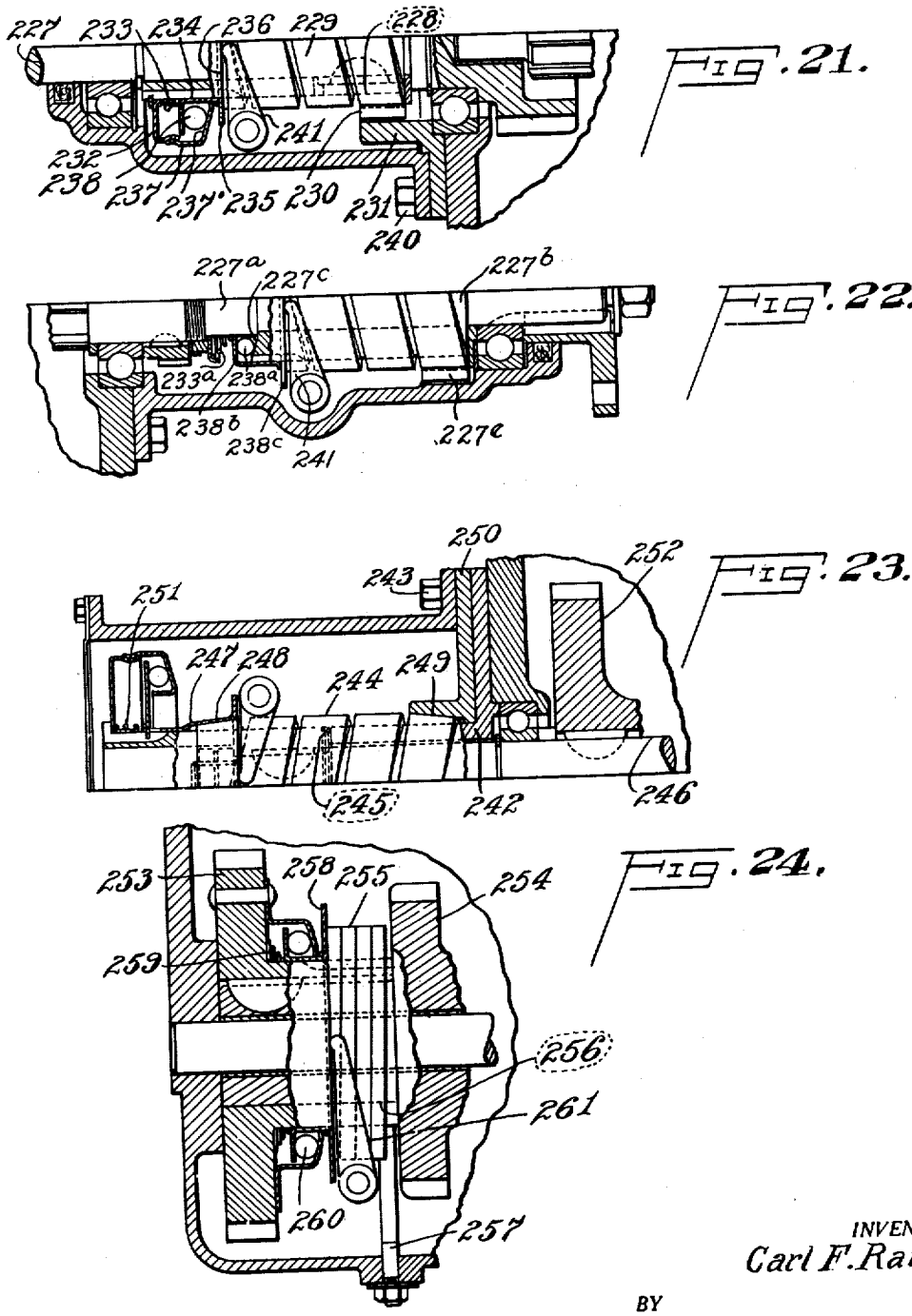

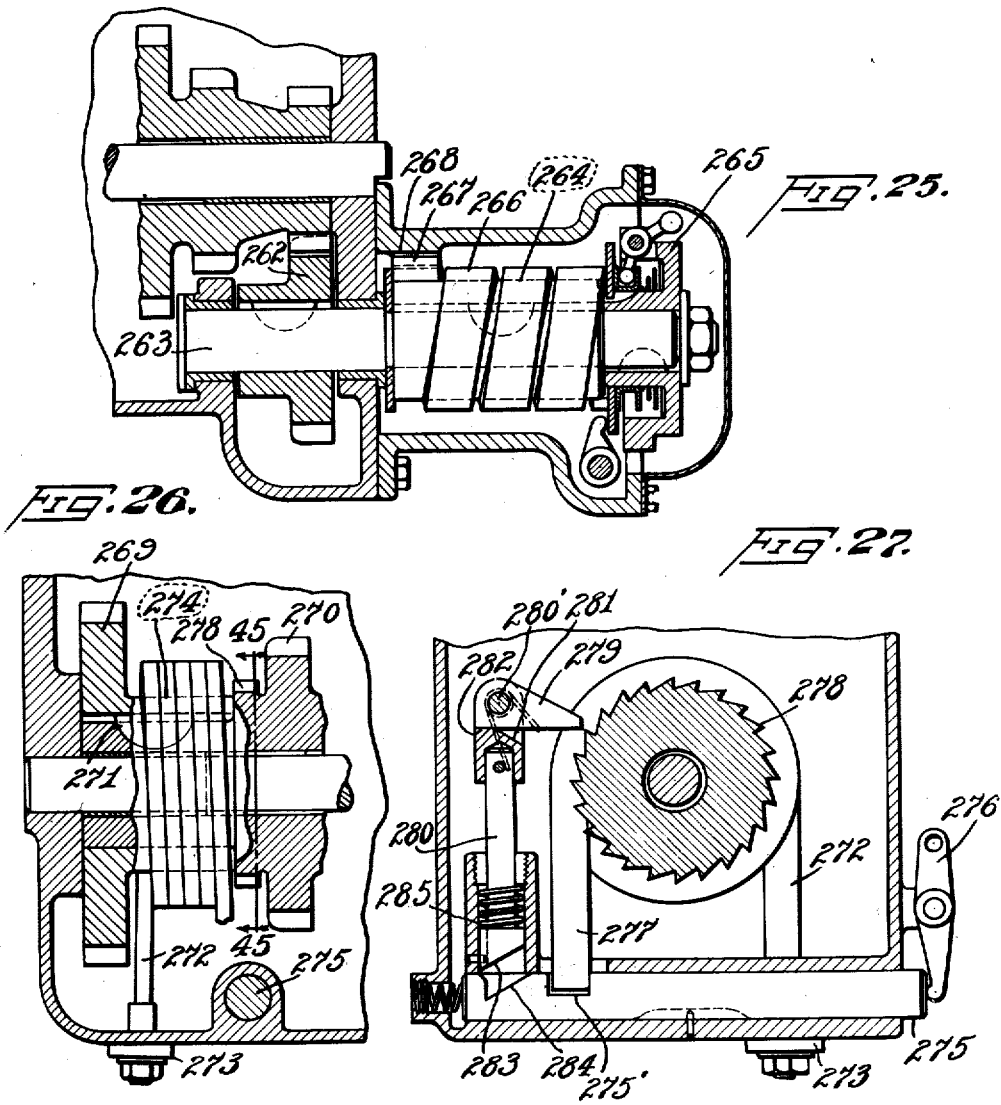

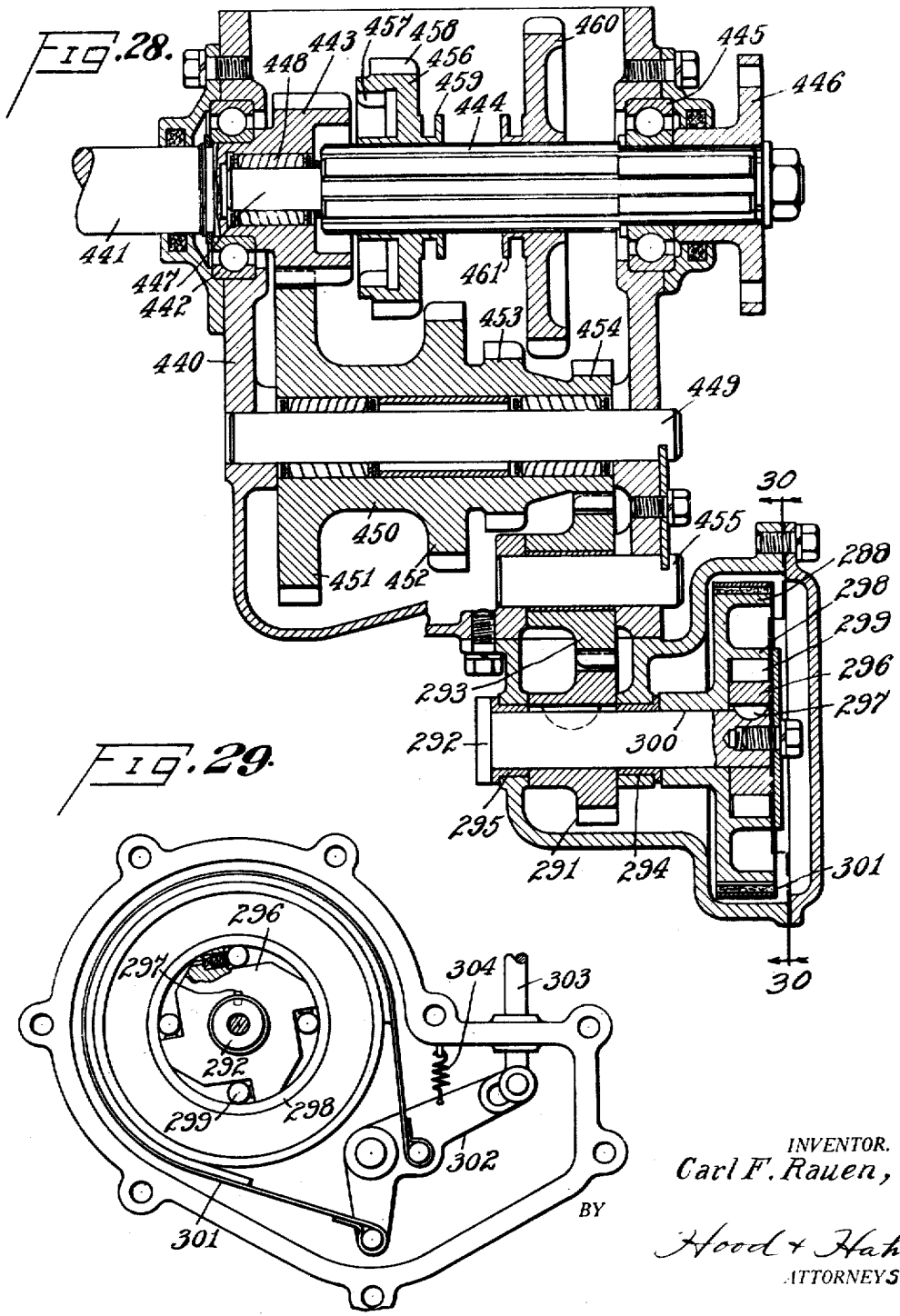

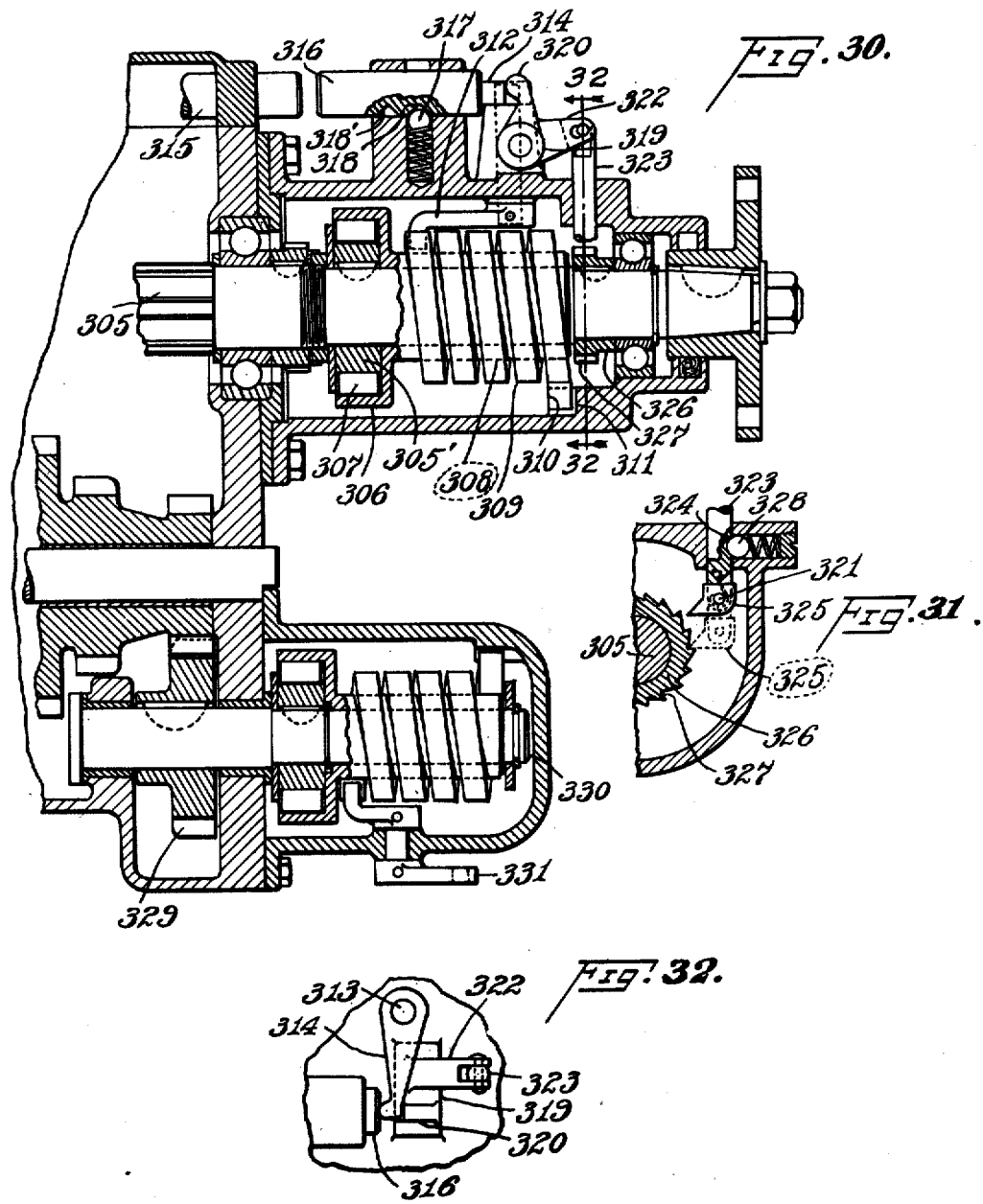

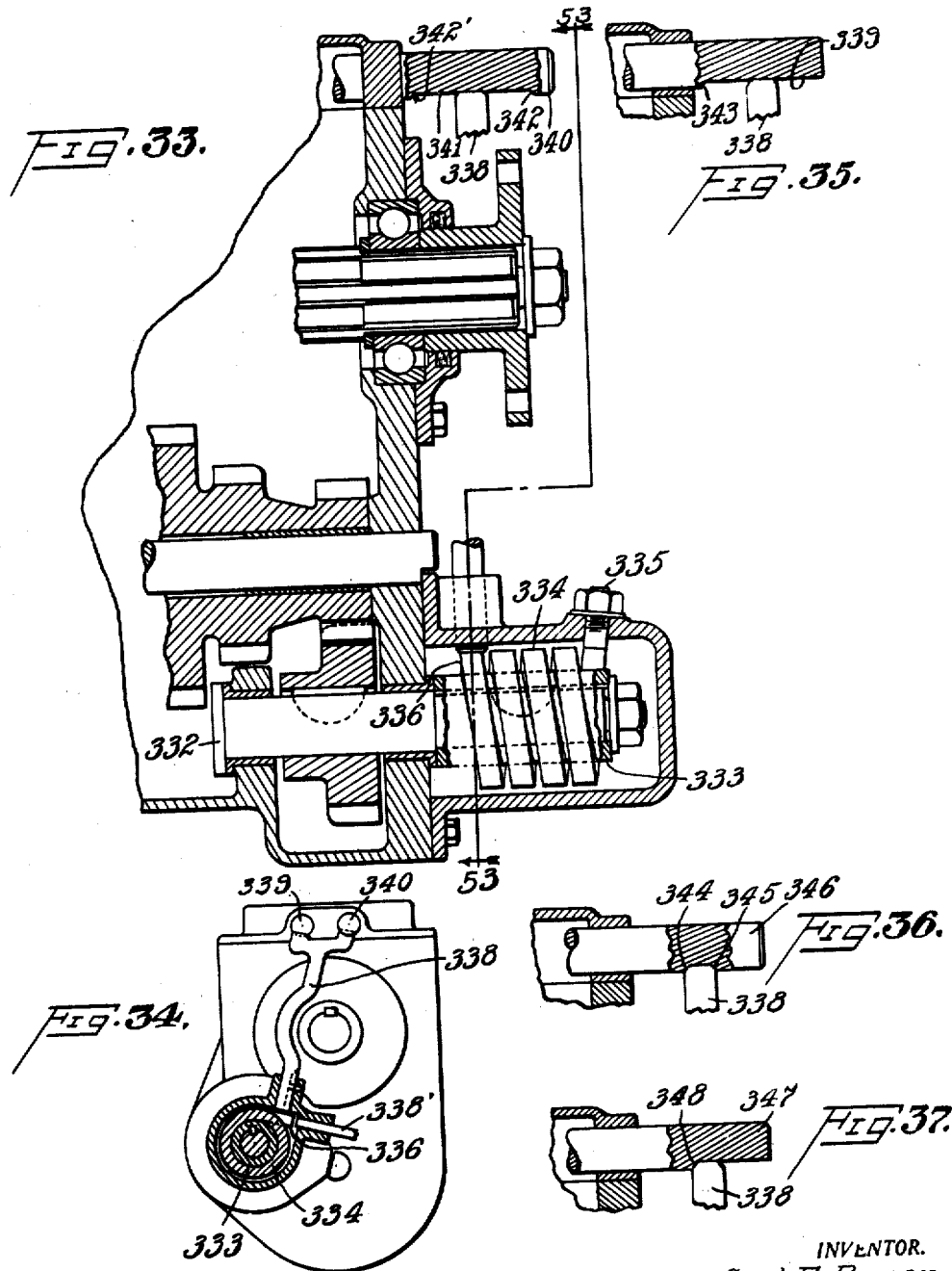

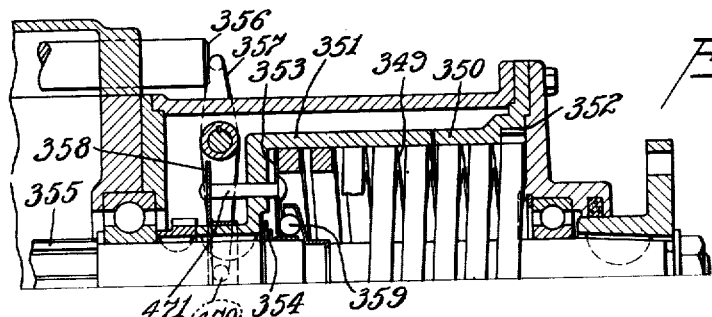
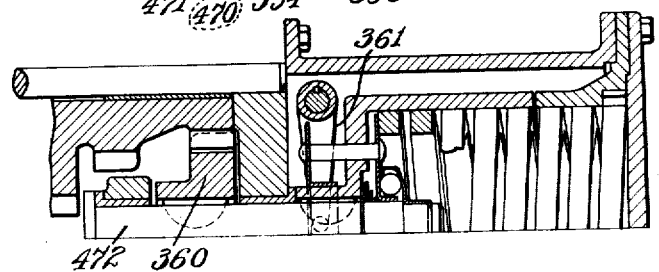
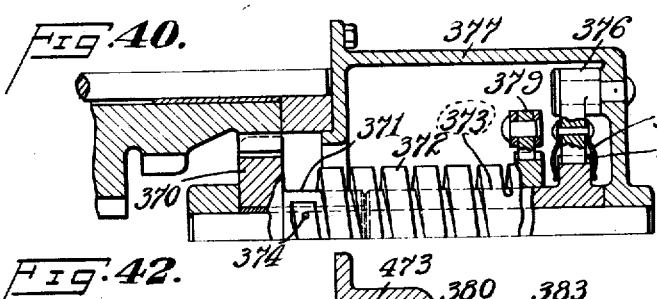
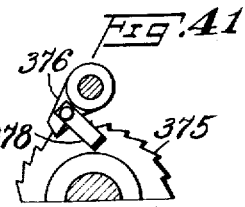
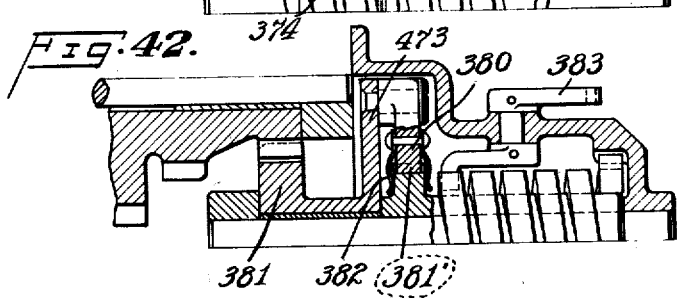

Oct. 27, 1942.            C. F. RAUEN                2,299,765
       MEANS FOR PREVENTING RETROGRADE MOVEMENT
              OF MOTOR VEHICLES AND THE LIKE
         Original Filed Oct. 29, 1930    16 Sheets-Sheet 14
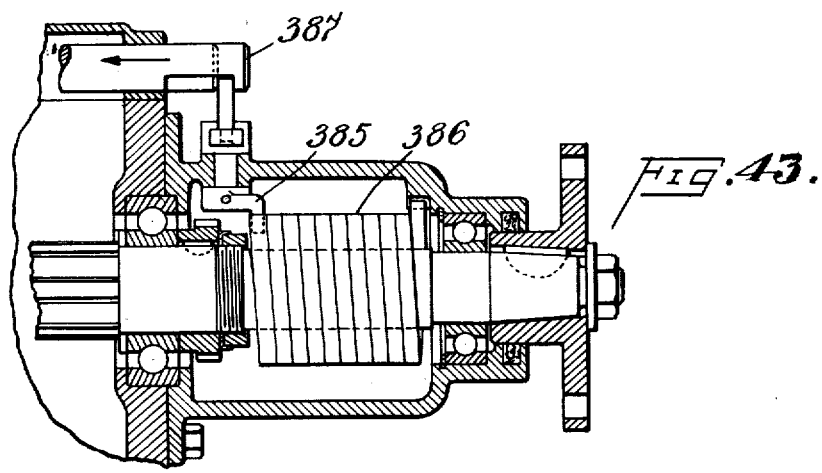
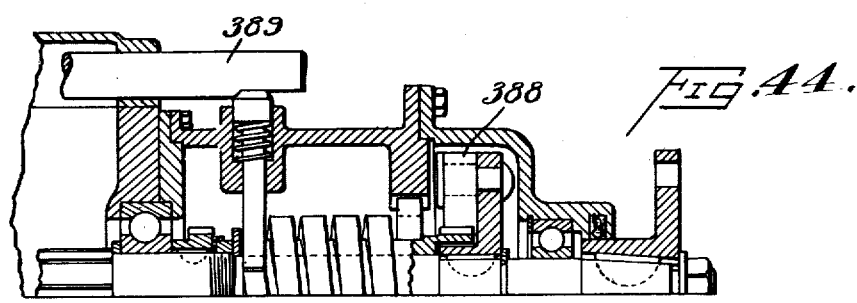
INVENTOR.
Carl F. Rauen,
BY
Hood & Hahn.
ATTORNEYS

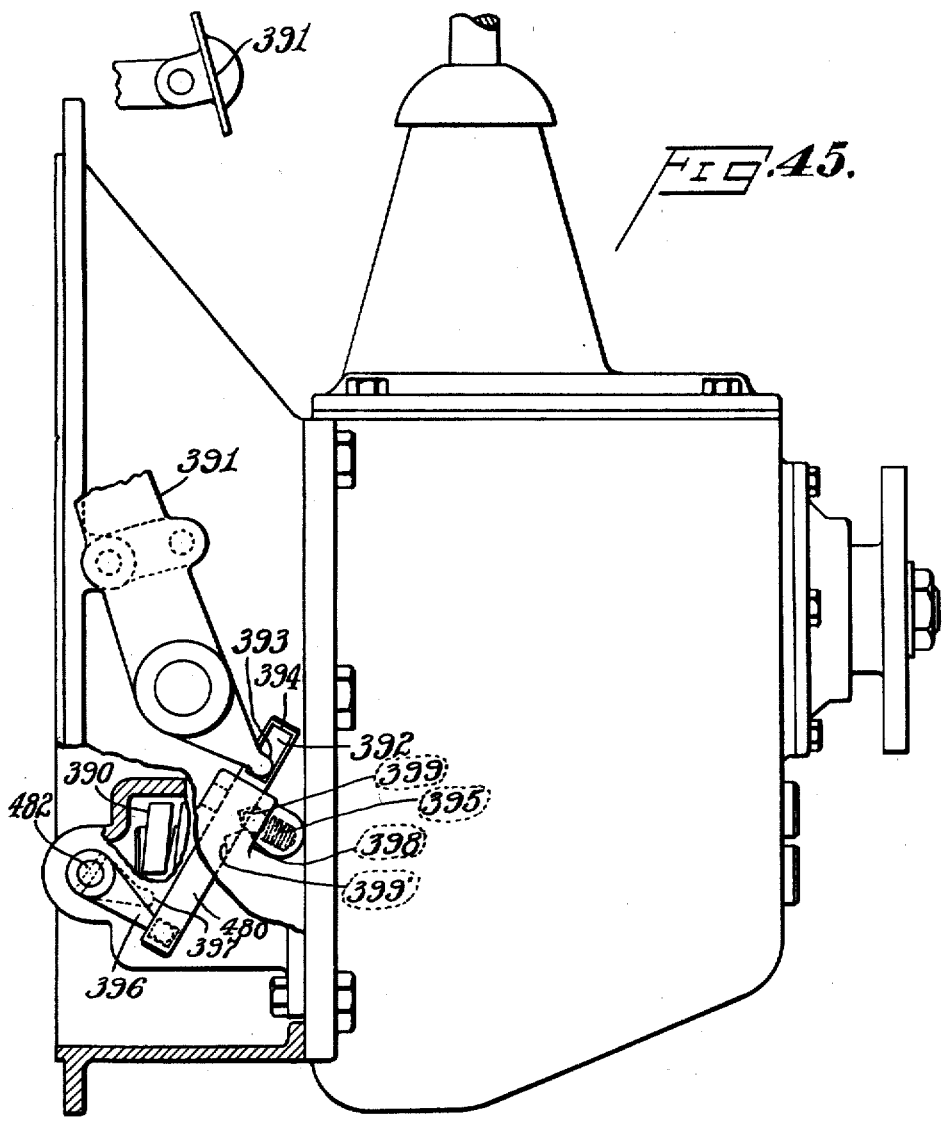

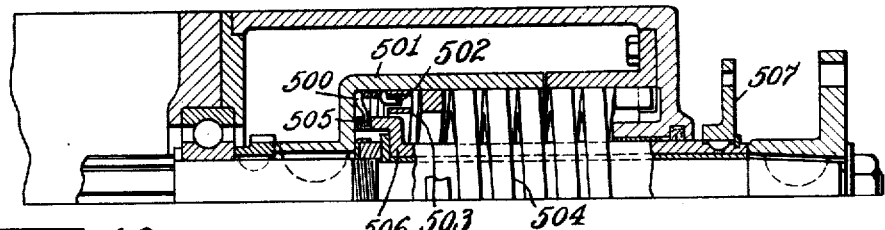
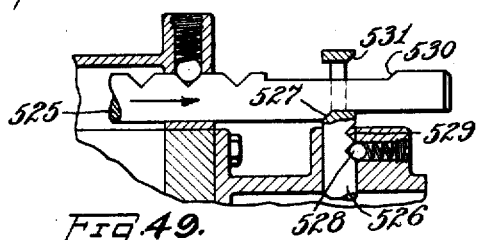
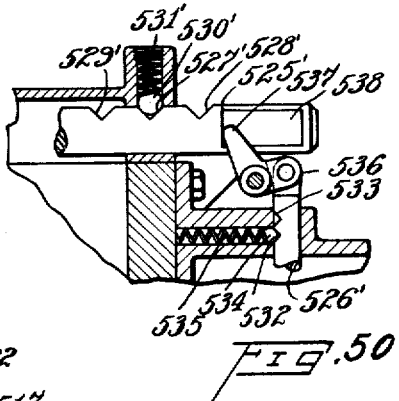
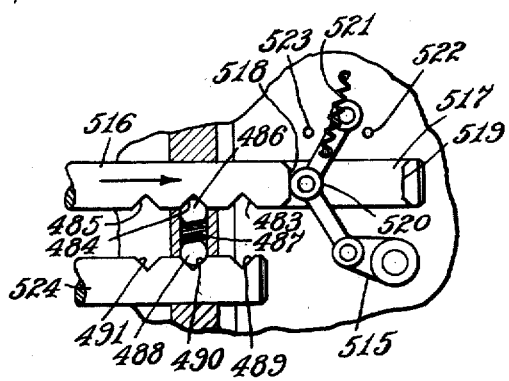
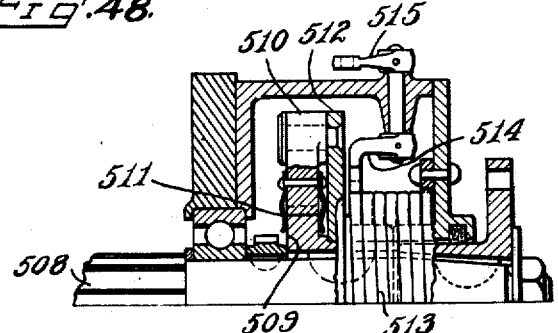

Patented Oct. 27, 1942

2,299,765

UNITED STATES PATENT OFFICE 2,299,765

MEANS FOR PREVENTING RETROGRADE MOVEMENT OF MOTOR VEHICLES AND THE LIKE

Carl F. Rauen, Grosse Pointe, Mich.

Application October 29, 1930, Serial No. 491,837
Renewed January 18, 1939

50 Claims. (Cl. 192—4)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates to power transmission systems and is especially adaptable to motor vehicles. An object of the invention is to provide simple and effective means for preventing movement of the automobile or other device in which a transmission is used in the opposite direction from that desired. This eliminates the necessity of using the foot or hand brakes to hold the car until the engine is clutched to the drive wheels and greatly facilitates starting the car up an incline as full engine torque may be applied to move the car without wasting any of it in overcoming the drag of the brakes until the clutch is fully engaged and the brakes are fully released. If the brakes are released before the clutch is fully engaged, with the ordinary construction, the engine has to overcome the down-hill movement of the car which adds a considerable load and a strain on the engine and drive mechanism and often causes the engine to stall.

This invention relates particularly to the use of self-energizing devices or what might be termed, self-wrapping devices which will cause a braking effect or locking effect due to their inherent characteristics. These self-wrapping devices are shown in several embodiments and organizations in the accompanying drawings and, as shown, may be used either by themselves or in connection with an over-running clutch of some sort such as a roller clutch or pawl and ratchet device. They are also illustrated in connection with centrifugal devices which render them operative or inoperative.

On all self-wrapping or self-energizing devices it is necessary that there be contact between the self-energizing device and the parts to be affected. This contact is sometimes a serious draw-back and often-times causes considerable wear as well as waste of power due to the frictional drag resulting from said contact. This is particularly true of the differential type of band brake, as shown in the drawings forming a part of this application. To obviate this difficulty, I have used in connection with this differential band brake or self-energizing device, a one-way clutch of either the roller or pawl and ratchet type, so that the over-running may be done in the clutch and so that there need be no frictional drag between the self-wrapping device and the rotating member during normal operation of the organization.

I have shown one-way clutches of the roller type and of the pawl and ratchet type in connection with self-wrapping spring clutches, and it is to be noted that the need of a roller clutch or similar device is not quite so imperative in connection with spring clutches as in connection with automatic band brakes for the drag, due to the fact that the radial tension of the spring clutch at the point of contact with its mating member can be varied by adding more coils to the spring. However, in some cases there is a limitation imposed upon the number of coils that can be added, due to restriction of the available space, in which case it is better to use a one-way clutch device in connection with the self-wrapping spring.

In some of the embodiments illustrated herein, I use the spring clutch only, in connection with the centrifugal device. In this modification, the spring clutch is made slightly larger than its mating drum, and the initial drag to start the spring wrapping is produced by an auxiliary spring under control of the centrifugal device. This centrifugal device is so designed that when the vehicle to which this transmission is attached is moving, the centrifugal force causes the auxiliary spring to be compressed so that no drag can be put on the spring clutch member.

The self-wrapping of the spring clutch can be obtained in several ways, one of which is described above, by means of producing an initial drag under the control of the centrifugal device; another is by making the spring clutch with a slightly smaller internal diameter than the drum with which it cooperates, in the case of an external spring. However, in the case of an internal spring, the conditions are reversed, and the outside diameter of the spring should be slightly larger than the internal diameter of the drum with which it contacts. The amount of radial tension necessary to cause self-wrapping of these devices for a given load, varies in the case of a differential band brake with the proportion of the levers connecting the ends of the brake band, and in the case of the spring clutch, with the number of coils.

A further object of this invention is to provide a device of the character described which can be released when under load, with the minimum of effort. That is, when the car is stopped on a hill and being held thereon by means of one of the above described devices, the device may be easily released by applying pressure, in the case of the spring clutch, on the free end of the spring, thereby causing it to unwind and lose its holding power, or, in the case of the differential band brake, by applying pressure to one end of the band brake and causing it to unwrap. That this is necessary can be readily seen, for if the car stops on a hill and is held by such a device as the above described, and if it is desired to have the car move backwardly down the hill, it would be necessary to release a device of this nature in order to permit the driven shaft to be driven backward or for the car to coast backwardly down the hill. When devices of this nature are used on a propeller shaft, they are normally released by the shift lever, in order to drive the car backward. When they are used on one of the unidirectional shafts of the transmission, such as the clutch shaft, the countershaft, or the reverse idler or any gear meshing therewith, it is not necessary to release them from backward movement to reverse the vehicle, inasmuch as these shafts rotate in the same direction regardless of the direction in which the vehicle is driven. However, if a condition is met wherein it is desirable to permit the vehicle to drift backwardly after it has been stopped with the transmission in one of its forward-speed positions, if a device of this nature is on one of the unidirectional shafts, it will hold the vehicle, and the load on the device will be impressed on the transmission gear teeth, holding them in such close frictional intermesh as to make it difficult or almost impossible to move the gears of the transmission out of mesh. Therefore, means must be provided to take the load off the self-energizing device in order that the gears may be moved out of mesh.

Inasmuch as ordinary jaw-clutching devices would be impractical for use in cases like this, as they would have to be unmeshed while under load, and while a multiple disc clutch could perform the function, the necessary spring pressure to be overcome to release the load would be undesirably great. Consequently, a device which has self-energizing characteristics is adopted for this purpose, as devices of this nature can be released with very little effort when under load.

A further object of this invention, then, is to provide a sprag releasable by either the hand or the foot brake or both, if desired. Another object of this invention is to provide a sprag that can be readily released when under load.

The several embodiments herein shown are the results of considerable testing and thought, as well as experimental designing, extending over a period of several years.

Further objects of this invention will be more fully set forth in the following specification and claims.

In the drawings:

Fig. 5 is a view on the line 5—5 of Fig. 4;

Fig. 6 is a view on the line 6—6 of Fig. 4;

Fig. 7 is a semi-diagrammatic view of part of an automobile structure showing the rear axle and the transmission and showing a device constructed in accordance with the present invention, and showing a releasing means therefor connected to the separate pedal;

Fig. 8 is a broken section of a transmission embodying a device constructed in accordance with the present invention;

Fig. 11 shows a modification of this device mounted on the drive gear of the transmission;

Fig. 12 is a sectional view on the line 12—12 of Fig. 11;

Fig. 13 is a broken sectional view showing my device mounted on a reverse idler of an automobile transmission;

Fig. 14 is a broken elevation looking from the right end of the device illustrated in Fig. 13;

Fig. 15 shows another arrangement of my device mounted on the reverse idler of an automobile transmission;

Fig. 16 is a broken view showing the release mechanism for the arrangement illustrated in Fig. 15;

Fig. 17 shows my device made up as an auxiliary unit to be mounted on the transmission case;

Fig. 18 is an end view of the organization of Fig. 17, parts being broken away for clarity of illustration;

Fig. 19 is a view on the line 19—19 of Fig. 17;

Fig. 20 shows a device of the type illustrated in Fig. 17 mounted on an automobile transmission case;

Fig. 21 is a further modification of my device controlled by a centrifugal arrangement and mounted on the drive gear of the transmission;

Fig. 22 shows a modified form of this same device mounted on the propeller shaft of the transmission;

Fig. 23 shows another modification of this device mounted on the countershaft of the transmission;

Fig. 24 is a modification of the organization illustrated in Fig. 23;

Fig. 25 shows a modification of this device mounted on the reverse idler of the transmission;

Any of the arrangements shown in Figs. 21 to 25, inclusive, can be used interchangeably in any of the positions shown.

Figure 1:
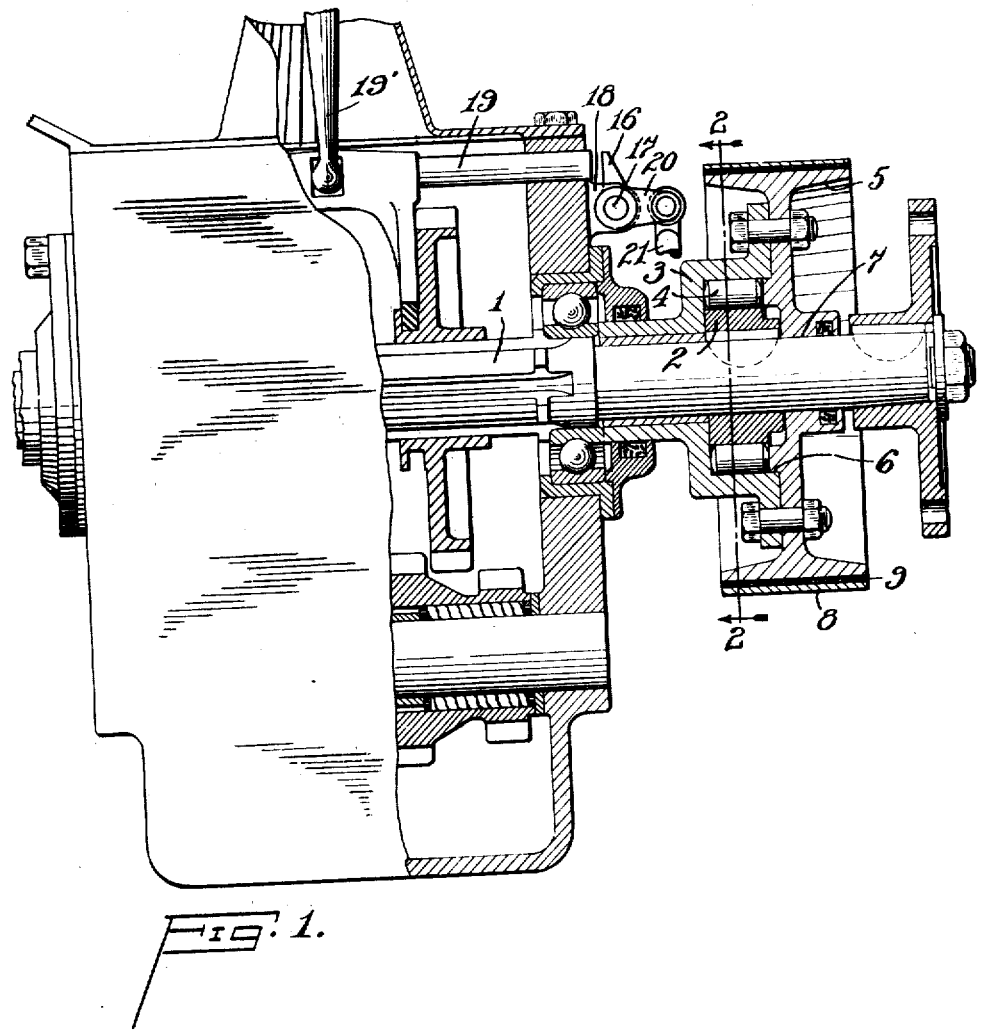
Fig. 1 is a side elevation, partly in section, of an automobile transmission, having a device constructed in accordance with the present invention, applied to the main shaft thereof.
Figure 2:
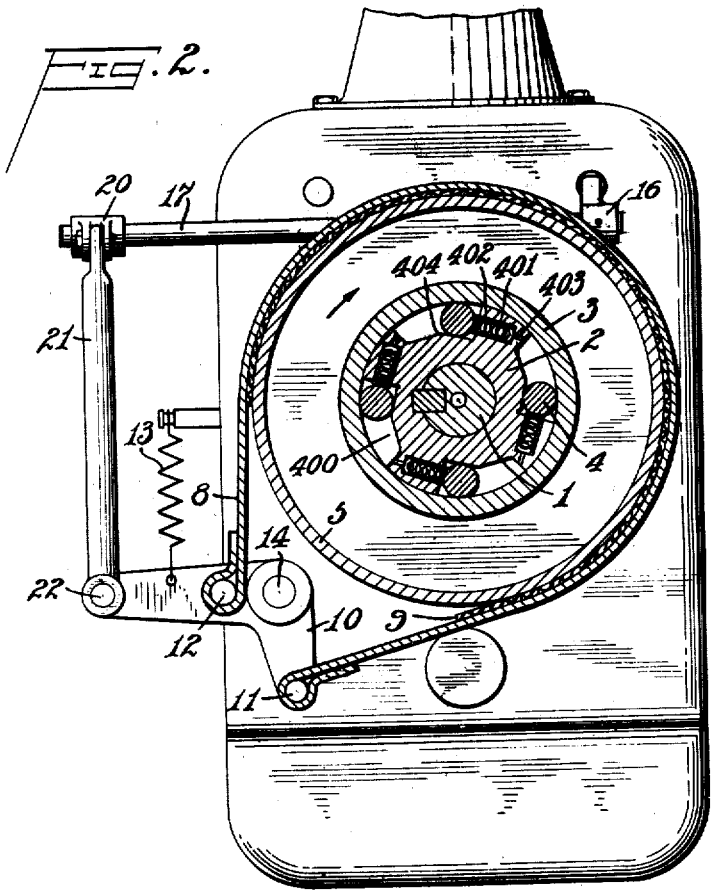
Fig. 2 is a transverse sectional view on the line 2—2 of Fig. 1.

Fig. 26 shows another modification of this device;

Fig. 27 is a view on the line 27—27 of Fig. 26 and shows the releasing mechanism more in detail;

Fig. 28 shows a transmission with a device such as is disclosed in Figs. 1 and 2 mounted as an auxiliary on the transmission;

Fig. 29 is a view on the line 29—29 of Fig. 28;

Fig. 30 shows one of my devices on the propeller shaft and another one on the reverse idler, thereby giving an arrangement wherein the car will not move down hill regardless of whether the gears are in neutral, in any of the forward speeds, or in reverse drive;

Fig. 31 is a broken section taken substantially on the line 31—31 of Fig. 30;

Fig. 32 is a fragmental plan view of a detail of the device shown in Fig. 30;

Fig. 33 shows an arrangement wherein a spring clutch is mounted on an extension of the reverse idler shaft, and is under control of the shift rails and shift mechanism of an automobile transmission;

Fig. 34 is a view taken substantially on the line 34—34 of Fig. 33, and on a reduced scale;

Fig. 35 is a fragmental section of a detail;

Figs. 36 and 37 are views similar to Fig. 35, but illustrating modified forms of the mechanism disclosed therein;

Figs. 38 and 39 disclose a further embodiment of my invention mounted on the propeller shaft and on the reverse idler, respectively;

Figs. 40 to 42, inclusive, show still further embodiments of my invention mounted on the reverse idler gear;

Figs. 43 and 44 show further embodiments mounted on the propeller shaft;

Fig. 45 illustrates a further form of release mechanism for the sprag;

Figs. 46 and 47 show still further embodiments of my invention mounted on the propeller shaft; and Figs. 48 to 50, inclusive, show control means for the sprag.

In Fig. 1, the numeral 1 designates the main shaft or drive shaft of an automobile transmission. Keyed to this shaft is a cam member 2 of a roller clutch or silent pawl and ratchet mechanism, which is adapted to cooperate with the shell member 3, through the medium of the rollers 4. The shell 3 of the roller clutch is loosely mounted on the shaft 1 and free to rotate thereon and has bolted to it a brake drum 5, which brake drum is centered in the shell 3 at 6. This brake drum also has a running fit on the shaft 1 at 7. A brake band 8 provided with lining 9 surrounds the brake drum 5 and is more clearly shown in Fig. 2. The ends of the brake band 8 are connected to a bell crank lever 10 in any suitable manner, and preferably as shown at 11 and 12. Spring 13 is anchored to the case, and one end thereof is connected to the bell crank 10, thus urging the lever toward clockwise rotation to tighten the brake band 8 on the drum 5.

The type of brake band shown here is what is known as the differential type or self-acting type of brake band; that is, when the drum is rotated in the direction of the arrow, the brake becomes self-acting and the frictional effect tends to tighten the band on the drum, whereas when the drum is rotated in the opposite direction, the tendency is to loosen the band. It is essential to such operation that the points of attachment of the ends of the band at 11 and 12 bear a certain relationship to the pivot point 14 of the bell crank 10. This type of band brake is well known, and its action as well as formulae governing the lever arms 11 and 12 are to be found in several textbooks and in particular on page 565 of "Machinery's Handbook," sixth edition. To make a brake like this self-active, of course, it is necessary for the brake band to be in contact with the brake drum at all times, and in order to insure this relation, the spring 13 is provided. The positions of the pins 11 and 12, with relation to the pivot point 14, must be so proportioned that when the brake drum 5 is rotating in the direction of the arrow, this rotation will be immediately arrested by the self-locking or self-wrapping characteristics of the brake.

Inasmuch as the brake band must be in contact with the drum at all times, it can readily be seen that considerable heat will be generated here, and that, in the absence of special provisions, loss of power and rapid wear of the brake band will result. I therefore put a one-way clutch or pawl and ratchet mechanism, as exemplified in Figs. 2 and 4, between the brake drum 5 and the shaft 1, so that the brake drum can normally remain stationary while the vehicle is being driven forward, and the action of the roller clutch permits the shaft and the cam 2 to turn in a forward direction or in a direction which is opposite to the arrow in Fig. 2, while the brake drum 5 remains stationary. As is clearly shown in Fig. 2, the cam member 2 is formed with a purality of peripherally extending pockets 400 in which the rollers 4 are mounted. The rear wall of each of said pockets is formed with a recess 401, and a plunger is mounted in each of said recesses, a coiled spring 402 likewise being mounted in each of said recesses and said springs urging said plungers outwardly. Preferably, a vent opening 403 is provided for each of said recesses 401 to eliminate any dashpot action. When a vehicle is stopped on a hill, the shaft 1 tends to rotate in the direction of the arrow, thus tending to move the plunger-carrying walls away from the rollers 4. The springs 402 are thus permitted to expand, tending to hold the rollers 4 against movement with the cam member 2, and thus the high portions 404 of the cammed bottom walls of the pockets 400 engage the rollers 4 to lock the cam member 2 to the shell 3. The plungers have been found to be a great aid to instantaneous action of the one-way clutch. The rollers thus being wedged in the pockets 400, the shell 3 and the drum 5 are caused to rotate together in the direction of the arrow in Fig. 2, and such rotation is almost immediately arrested by the band brake 8 and its coacting bell crank. It is therefore seen that this device will automatically prevent any undesired backward movement of the propeller shaft or drive shaft 1.

In order that the vehicle may be driven backward by the ordinary reverse gears, it is necessary that the band brake be released to permit the shaft 1 and the drum 5 to turn backward. To accomplish this result, I provide a linkage which is operated when the reverse gears are meshed to drive the car backwardly. This linkage consists of a lever 16 mounted on a shaft 17, which shaft is suitably journaled as at 18. The lever 16 is mounted with it free end disposed in the path of the reverse gear shifting rail 19, so that, when the shift lever 19' is moved to place the transmission in reverse drive position, said rail 19 engages the lever 16 to rotate the same to the right in Fig. 1, which rotation carries with it another lever 20 to the free end of which is connected a release rod 21. Said rod 21, in turn, is connected to the bell crank lever 10 at 22, whereby such movement of the rail 19 is transmitted to free the brake band 8 from the brake drum 5, thus permitting reverse rotation of the drive shaft 1. As soon as the rail 19 is returned to the position of Fig. 1, the spring 13 returns the brake band to its operative position in which retrograde movement of the vehicle is prohibited.

It will be noted from the foregoing arrangement that the transmission gears can be pulled to a neutral position while the car is still coasting backward, in which case the brake band would work rather suddenly. One way of eliminating this would be to include an arrangement wherein the brake pedal would have to be applied before the gears could be pulled out of reverse, thereby insuring that the vehicle is stationary and that the band brake could not be applied suddenly. However, due to the nature of this band brake and its lining as well as its characteristics, the lever arms of the bell crank shaft can be so proportioned that its application will not be too severe. A further means of preventing such application of the brake band or its equivalent in this kind of construction will be described further on in this specification.

Figure 3:
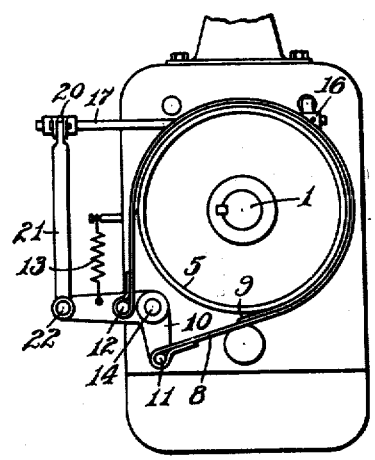
Fig. 3 is a view similar to Fig. 2 but showing an embodiment of the invention in which the roller clutch is not utilized.

The design as shown in Fig. 3 is identical with that shown in Figs. 1 and 2 except that the roller clutch has been omitted, inasmuch as under some particular conditions the drag of the brake drum on the band may not be objectionable.

I have therefore shown, in Figs. 1, 2 and 3, the application of a self-wrapping or self-energizing device for sprag purposes. The term "sprag," as used here, refers to devices that prevent retrograde movement of a vehicle, but do not impede forward movement thereof, and which are more or less automatic in their nature.

Figure 4:
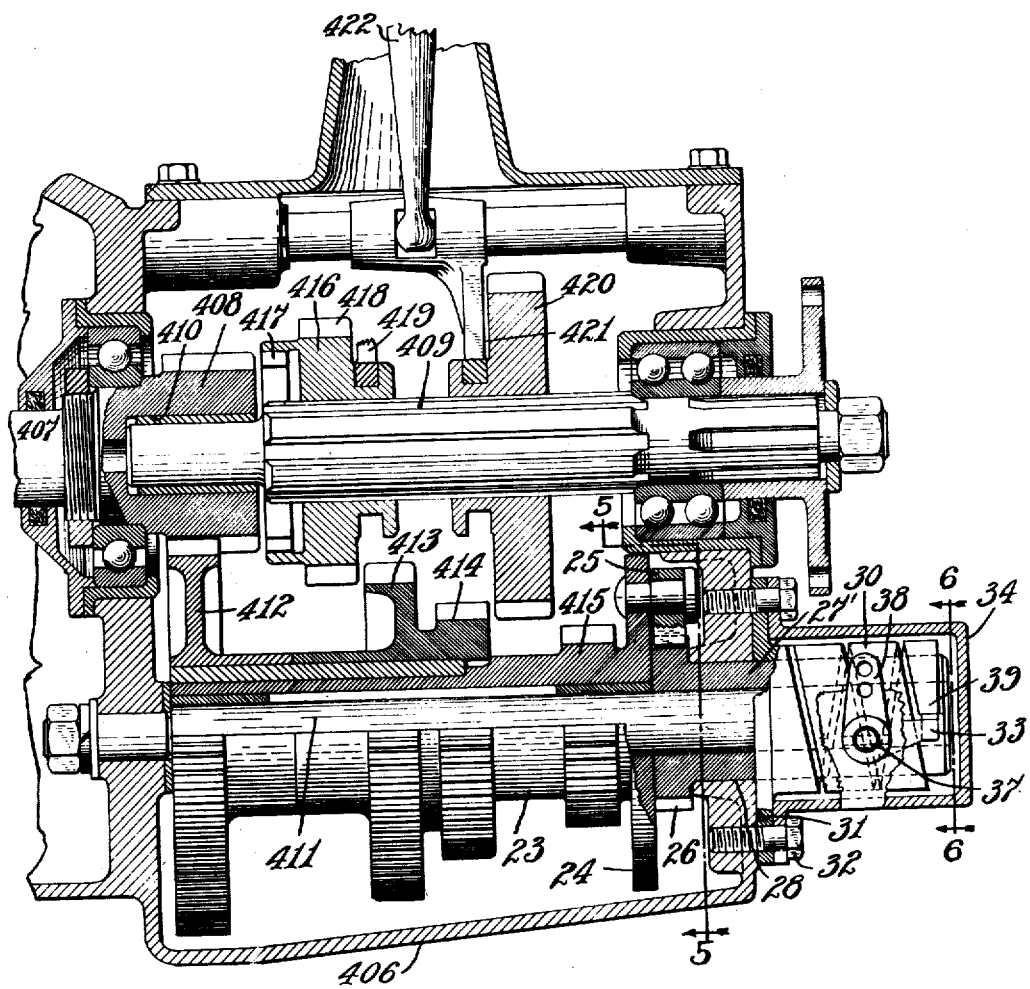
Fig. 4 is a longitudinal sectional view of an automobile transmission in which a device constructed in accordance with the present invention is applied to the countershaft.

In Figs. 4 to 6, I have shown another form of the self-energizing or self-wrapping device and have located it on the countershaft of the automobile transmission. I have illustrated the transmission in some detail, the same comprising the casing 406, in which is journaled one end of the usual drive shaft 407, said shaft carrying, within the casing 406, a pinion 408. The driven shaft 409 has its one end journaled in a wall of the casing and has its opposite end journaled in a socket 410 formed in the end of the drive shaft 407. A countershaft 411 parallels the driven shaft 409 and has journaled thereon a spool 23. To said spool is splined a gear 412 which is constantly in mesh with the pinion 408, and said spool further carries pinions 413 and 414. A reverse drive pinion 415 is, in the embodiment shown, formed on the spool 23. A gear 416 is slidably splined on the driven shaft 409 and is provided with internal teeth 417 adapted to be meshed with the pinion 408 to provide a direct driving connection between the drive shaft and the driven shaft, and is further provided with external teeth 418 adapted to be meshed with the teeth of the pinion 413 for a second-speed driving connection between the driving and driven shafts. A shifter fork 419 of usual construction is provided for shifting the gear 416. A gear 420 is shifted through the medium of a shifter 421 and may be selectively meshed with the pinion 414 for a low-speed forward driving connection, or with an idler gear (not shown) constantly in mesh with the reverse drive pinion 415. A shift lever 422 is operable to control the movement of the shifter forks 419 and 421. As shown in this figure, the member 23 is provided with a plate 24 on which are mounted four pawls 25 adapted to cooperate with the twenty-one teeth of ratchet 26. Pawls 25, preferably equally spaced on the flange 24, are staggered with relation to the teeth of the ratchet, as is shown in Fig. 5, and will pull away from the ratchet teeth under the influence of centrifugal force and against the springs 27, thereby preventing clicking of the pawls on the ratchet teeth when the car is moving. These pawls and springs are so designed that, at the normal idling speed of the engine, there will be no clicking of the pawls on the ratchet teeth. The ratchet 26 is equipped with a drum portion 27', which has a bearing in the transmission housing 406 at 28, and which is provided with a central bore for receiving one end of the stationary countershaft 411. A spring clutch member 30 is wound about said drum 27, the latter having an outside diameter slightly larger than the internal diameter of the spring clutch 30. This spring clutch, as shown, is formed preferably from a piece of tubing and is provided with a flange 31 which is non-rotatably anchored to the transmission case by means of a bolt 32 or the like. The tube is then milled with a spiral groove to give it the characteristics of a spring.

This spring clutch 30 prevents movement of the drum 27 in the direction indicated by the arrow in Fig. 6, which direction is opposite to the normal direction of rotation of countershaft spool 23. However, no restraint against movement in the opposite direction is placed on the drum 27 by the clutch 30. A release lever 33 is carried by a shaft 37 journaled in the side of the housing 34 and in the boss 35 (Fig. 6), and said shaft carries also a lever 38 disposed without the housing. The lever 33 is adapted to engage the free end 39 of the spring clutch to cause unwinding of this spring, thereby permitting the drum 27 to turn in the direction indicated by the arrow in Fig. 6. The lever 38 of this release mechanism is provided with several holes for selective connection with an actuating rod, and said lever 38 may preferably be connected to a pedal, as shown in Fig. 7, said pedal being so disposed as to be conveniently engaged by the operator's foot as he applies the foot brake, so that whenever the brakes are applied or the separate pedal is operated, the lever 33 will cause the spring to unwind, thereby releasing the sprag from holding the car, its holding function being thereby transferred to the normal brakes of the automobile. The need of this release is for emergency purposes only. The need of such a release will be more clearly seen from the following description of the action of this device:

The device as disclosed in Fig. 4 will prevent rotation of the countershaft spool 23 in one direction only and will consequently prevent rotation of the drive gear also in one direction only, and inasmuch as the reverse idler gear is usually in mesh with the gear 415, the device will prevent the idler gear from rotating in one direction only. When the gears of the main shaft are in neutral and the engine running with the clutch engaged, the countershaft is turning, and the pawls 25, due to centrifugal force, are swung out from contact with the ratchet teeth 26. Now let us suppose it is desired to drive the car up a hill either backward or forward. The engine clutch is released, the countershaft stops rotating and the low or reverse gears are meshed, and inasmuch as the countershaft, reverse idler, and drive gear turn in the same direction regardless of which direction the vehicle is to be driven, it will be seen that any force, such as gravity, tending to cause the countershaft to rotate in a direction opposite to its normal direction of rotation, will immediately cause the pawls 25 to engage with the ratchet 26 and arrest such undesired rotation, inasmuch as the drum 27, which is part of the ratchet 26, will be prevented from moving by the spring clutch. Let us suppose that the car has been stopped facing up hill, with the gears in either high, second or low, in which case the spragging device will come into operation and prevent retrograde movement of the car. If it is now desired to drive the car backward, or if the car has been stopped in high gear and it is now desired to start it in low gear, the operator will find, on trying to shift the gears to the neutral position, that he is unable to do so. This is caused by the friction between the gear teeth, due to the load of the car coming onto the sprag through the medium of the gear teeth, which cannot readily be overcome with the ordinary shift lever.

Therefore, in order to shift to neutral, it will be necessary either to release the sprag device or to move the car forward so that the gears can be pulled out of mesh at a period of no stress. However, it is not always possible to move the car forward; therefore, a releasing means somewhat of the nature shown in Fig. 4 must be provided. This releasing means consists of the levers 38, 33, and their cooperative parts which are connected to suitable operating mechanism.

When the operator of a vehicle stops on the hill and finds that he is unable to pull the gears out of mesh, he immediately applies the brake pedal and pedal 68', which frees the sprag, and, in turn, causes the brakes to hold the car from moving down the hill. He is therefore able to shift to any gear which he desires, and then, upon release of the pedals, the sprag again takes hold and prevents movement of the car in a reverse direction if the transmission is positioned to drive the vehicle forward; or in a forward direction if the transmission is positioned to drive the vehicle rearward. By connecting the release mechanism for operation with the brake pedal, I also prevent any sudden application of the spragging device which could happen if a separate pedal is used in the case where the car is in reverse gear and moving forwardly or in the case where the car is in forward gear and moving rearwardly, and if then the sprag is suddenly applied by relieving pressure on the sprag pedal, there will be a sudden stoppage of the car with a strain on the parts, and possible breakage.

Fig. 7 is a more or less diagrammatic view of a conventional automobile transmission and brake system in which a foot brake lever 58 is pivoted on the transmission case at 59 and is shown connected to the rear wheel brakes 60 by means of the rod 61. In the case of four-wheel brakes, the connection will be changed accordingly.

The sprag release lever 38 is connected to a separate pedal-operated lever 68 through the medium of an adjustable rod 69. It will therefore be seen from this arrangement that the sprag can be released by a separate pedal independent of any of the brake mechanism, if a construction like this is desired. If desired, the pedal 68' may be so disposed that it may conveniently be engaged by the foot of the operator as that foot is used to depress the foot-brake pedal 58'.

Fig. 8 illustrates a modification of the device of Fig. 4 wherein the pawls 25 are shown mounted directly on the gear 71 of the countershaft cluster. These pawls are adapted to mesh with the teeth of ratchet member 45 which is similar in all respects to the ratchet member 26 disclosed in Fig. 4. The spring member 72 in this case is preferably upset on its fixed end, as shown at 73, and provided with clutching teeth 74 meshing with mating teeth in a ring 75 which is fixed to the transmission case 76 by means of the bolt 77 or the like, and which thereby prevents the clutch member 72 from turning. This spring clutch member 72 is milled or otherwise formed to provide a spring shaped part and has an internal diameter slightly less than the external diameter of the drum 78 of the ratchet member 45. The releasing mechanism shown comprises the levers 38 and 33 similar to the like-numbered elements of Fig. 4, and is mounted in the housing 79 which is also fixed to the transmission case 76 by means of the bolt 77 or similar fastening means. The lever 38 may be connected to suitable releasing levers in any desired manner as, for instance that illustrated in Fig. 7.

Figure 9:
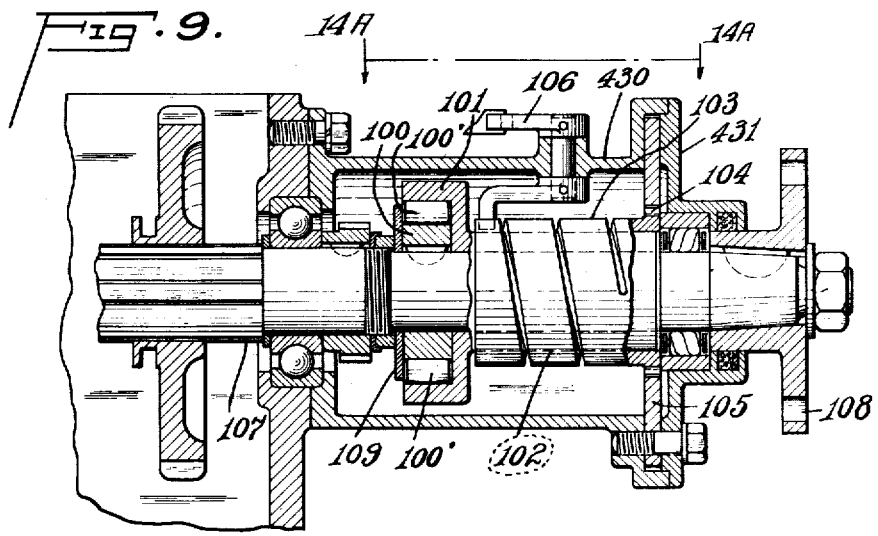
Fig. 9 shows a modified form of the device mounted on the propeller shaft of the transmission.

In Fig. 9 I have shown an arrangement on the propeller shaft, and which arrangement is a modification of that disclosed in Figs. 1 and 2. Its operation is also quite similar to that of the device illustrated in Figs. 1 and 2. In this design the cam member 100 of the roller clutch is keyed to the propeller shaft and is adapted to cooperate with the shell member 101 of the roller clutch through the medium of the rollers 100'. The shell 101 of said clutch is integral with a drum 102, which drum has an outside diameter slightly greater than the inside diameter of the spring clutch member 103. This spring clutch member 103 is provided with clutch teeth 104 adapted to mesh with similar teeth in a stationary member 105 clamped between the housing 430 and a cover plate 431 secured thereto.

In this design the shell member 101 and the drum 102 of the roller clutch are normally stationary, and while the car is being driven forward overrunning takes place between the cam member 100 and the shell member 101, thereby eliminating any drag which would be caused by rotation of the drum 102 within the spring clutch member 103. As mentioned before, in order to have a spring clutch operative, there must be a certain amount of frictional drag between the internal surface of the clutch and the outside surface of its mating drum, if it is to be self-acting. It is further emphasized that, when a spring clutch is used as herein shown, i. e., in connection with a roller clutch, wherein overrunning will take place when the vehicle is moving in the desired direction, accurate machining of the internal surface of the spring is much less important than it would be if the overrunning were to take place between the drum and the spring. Furthermore, due to the fact that the drum member need not rotate in normal operation, the initial radial tension between the spring and the drum may be greatly increased, thus decreasing the requisite number of turns of the spring about the drum.

Figure 10:
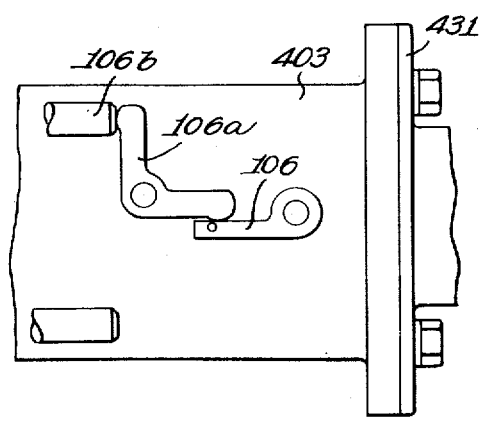
Fig. 10 is a plan view of Fig. 9.

As used in this design, the spring clutch is merely a holding member which can be easily released when under load, being thus quite similar to the brake band shown in Fig. 2. The releasing lever 106 is operated by a suitable linkage which would be somewhat similar in principle to that disclosed in Fig. 2, the release lever being rotated in a direction to unwind the spring when it is desired to drive the car backwardly or, for any other reason, to release the holding device. The lever 106, Figs. 9 and 10, is connected to the reverse shift rail 106b by the bell crank 106a, so that when the gears are shifted to reverse, the shift rail 106b, through the bell crank 106a, causes the release lever 106 to rotate counter-clockwise, thereby releasing the grip of the spring clutch on the drum 102 so as to permit reverse movement of the vehicle. The shaft 107 is the driven shaft of the transmission and is connected to the propeller shaft through the medium of the usual universal joint and the flange 108. The plate 109 is provided to hold the rollers 100' in place. A section through this roller clutch is similar to that shown in Fig. 2.

Fig. 11 shows my spragging device applied to the drive gear or clutch gear 109' of the transmission, this gear being connected to the engine of an automobile through the usual clutching mechanism. In the device as shown in this figure, a flange member 110 is keyed to the drive shaft 111 and carries a plurality of pawls 112 similar to those shown in Fig. 5. These pawls 112 are adapted to engage ratchet teeth 126 cut on a spring clutch member 113, which member has an internal diameter slightly less than the external diameter of the drum 114 so as to cause a gripping action in one direction of rotation. The drum 114 is provided with a flange 115 which is fixed to the housing 116 by means of bolts 117 or the like. Therefore, any rotation of the gear 109' opposite to its normal direction of rotation causes the pawls 112 to tend to turn the spring clutch in such a manner that it grips the drum 114, thereby preventing retrograde movement of the vehicle. The end of the spring clutch is provided with a lug 119, which lug is more clearly shown in Fig. 12 and which enters a slot in a ratchet member 121.

The release of the device as shown in Figs. 19 and 20 is for the purpose of removing the load from the gear teeth so as to permit the shifting of the gears as hereinafter referred to, and operates as follows:

A pawl 122 is mounted on the rod 123, which rod is slidably mounted in case 116, as shown at 120, and is connected for operation in any manner desired. The pawl 122 is adapted to pivot on the pin 124 which is anchored in the rod 123. A spring 125 is provided to hold the pawl always in a position to engage the teeth of the ratchet 121. Pawl 122, as shown in Fig. 12, is in the position where it is ready to release the sprag by movement in the direction of the arrow. This movement causes the spring to unwind, thereby freeing the same from its gripping engagement with the drum 114. The movement of the rod 123 in the direction of the arrow will also cause the ratchet teeth 126 to pull away from the pawl 112, and, as the brakes are applied during the movement of the rod 123, if said rod is connected to be operated with the foot brake as shown in Fig. 7, the load will be transferred from the sprag to the brakes, which will now hold the car, and the gears may be shifted as desired.

The spring clutch arrangements as shown in Fig. 11 wherein neither end of the spring is positively anchored, as was the case in Fig. 4, requires a different kind of releasing device from that disclosed in Fig. 4, inasmuch as every time the sprag is released the whole spring rotates and does not tend to return to its starting point. Therefore, a mechanism similar to that disclosed in Fig. 12 would be required to release a sprag having a construction of the type disclosed in Fig. 11. A release of the type shown in Fig. 12 has a further advantage in that, if it is connected to the brake operating levers, wear of the brake lining will not affect the degree of unwinding of the spring to produce release, as would be the case in the other type of release.

It will be noted that, in the organizations shown in Figs. 11 and 12, whether the brakes are fully applied or only partially applied, this mechanism will be ready to hold the car after being released by the application of said brakes, immediately upon release of the brake pedal. This is due to the fact that, when the brake pedal is released, the release ratchet 145 follows up just as far as the brake pedal travel will permit, and the spring clutch is in immediate readiness to hold the car again.

Fig. 13 is a partial sectional view of an automobile transmission with my invention shown on the reverse idler gear 146. It will be noted that in this installation, the spring clutch member 147 is used alone, no additional one-way clutch member of either the roller or pawl-and-ratchet type being used. Said reverse idler is provided with a cylindrical drum 148 which is slightly larger in diameter than the internal diameter of the spring clutch 147.

The spring clutch, when used alone, requires more turns in order that the radial tension may be low enough to make continuous relative rotation between the drum and spring practical; but, inasmuch as the reverse idler gear is the slowest turning gear in the transmission, there will not be the amount of heat generated nor will the drag due to the frictional contact between the spring and the drum 148 amount to as much as though said drum and spring were used in other locations in the transmission. The end 149 of the spring clutch is bent over and welded or otherwise suitably fastened to form a hook in which a pin 150 is inserted. The pin 150 is held by the U-shaped member 151, which member is provided with a threaded stem for anchorage in the cover plate 152. The release rod 147' can be operated by a foot pedal or other suitable means. The release rod 147' is adapted to press on the free end 153 of the spring clutch 147 to cause it to unwind and lose its grip on the reverse idler drum 148, thereby permitting the gears to be shifted from one position to another. It is to be understood that the only time that this release needs to be operated is when the sprag is holding the car on a hill and it is desired to pull the gears out of mesh without first moving the car forward. The release rod 147' is similar to that shown in Figs. 15 and 16.

In Fig. 15 I have shown another way of applying my invention to the reverse idler gear. In this design the reverse idler 154 is provided with a shell member 155 of a roller clutch, said shell member cooperating with the cam member 156 of the roller clutch through the medium of rollers 157. Cam member 156 is provided with a drum portion 158, which is slightly larger in diameter than the internal diameter of the spring clutch member 159. Another drum member 160, substantially equal in diameter to the drum 158, is provided with a flanged portion 161 which is adapted to be fixed to the transmission housing 162. A pin 163 is driven into the drum member 160 and is adapted to protrude through a hole in the end of the spring clutch 164. A release rod 165 is provided to cooperate with the free end 166 of the spring clutch 159 for emergency release. This release rod is operated by the bell crank lever 167, which is connected preferably to a pedal or lever for release purposes.

As previously noted, when a spring clutch is used in connection with a roller clutch or a similar device, as shown in Fig. 17, the machining of the spring clutch may be much less accurate, and the radial tension between the spring clutch and the drums 158 and 160 may be considerably greater, as there is no relative motion between these parts except when the sprag is released, in which case the drag is removed. It will be noted that, inasmuch as the reverse idler always turns in the same direction regardless of which way the car is driven, any forces which tend to turn the idler in another direction will cause the roller clutch to rotate the drum 158 in a direction to wind the spring 159, which turning is prevented by the gripping action of the spring being transferred from the drum 158 to the drum 160, which is positively anchored to the transmission case.

Fig. 17 shows an accessory model of this device, that is one that can be removably mounted as a separate unit on the transmission case and be sold as optional equipment. In this design an annular gear 168 is provided to form the shell member of a roller clutch and is adapted to mesh with one of the transmission gears, as I have shown in Fig. 20. In this particular instance, it is meshing with the reverse idler gear 169.

The gear 168 is centered on the cam member 170 of the roller clutch by the four lobes 171. The cam member 170 is provided with clutch teeth 172 meshing with similar teeth in the drum 173. While I have shown these members in two parts, they may, in some instances, be made integral. The cam 170 is centered on a stationary shaft 174, the drum 173 also being centered on said shaft 174. The shaft 174 has a bearing in the housing 175 at 176 and on the other end has a bearing in the drum member 177, which member is provided with a flange 178 secured to the housing 175. The structure outlined here is quite similar in principle to that illustrated in Fig. 15; i. e., the stationary drum is used for anchoring one end of the spring clutch instead of anchoring the same by means of a hook and eye, as shown in Fig. 13. A releasing lever 179 is pinned to a shaft 181, which shaft carries also another lever 180 adapted to be connected to a release lever, which lever should preferably be the brake pedal lever or the hand brake lever.

In actual practice, the gear 168 rotates as indicated by the arrow in Figs. 18, 19 and 20, but when the vehicle is stopped in gear on a hill, the gear 168 tends to rotate in the opposite direction, thereby causing the roller clutch to become active and rotate the drum in such a manner as to cause the spring clutch to grip the drums 173 and 177, thereby preventing rotation of the gear 168, consequently preventing retrograde movement of the car. Referring again to Figs. 17 and 18, it will be obvious that the pin 182 prevents rotation of the spring clutch 183 on the drum 160 or 177. The requisite number of turns on the stationary drum is thus reduced. A very small pin can be used, since the load or the force required to prevent such rotation is very small, even though only 1½ or 2 turns of the spring on the drum are used.

In Figs. 21 to 25, inclusive, I have shown spring clutch arrangements wherein the spring is normally free on the drum, having an internal diameter slightly larger than the external diameter of the drum. These spring clutches are caused to wrap up upon undesired rotation of the shafts to which they are attached, by the friction between the plate pressing against their ends under the influence of a smaller spring, the friction resulting from this pressure being eliminated, when the car is moving in the desired direction, by a centrifugal device relieving the pressure against the plate which causes the friction. Referring in particular to Fig. 21, I have shown the drive shaft 227 of the transmission, a drum 228 being mounted thereon. This drum 228 may, in some cases, be made integral with the shaft 227. Surrounding this drum is a spring clutch member 229 having one end 230 provided with a lug which is anchored in the member 231. On the left end of the drum 228 is mounted a centrifugal device for controlling the operation of the spring clutch. Said device comprises a stamping 232 pressed on the drum 228 and forming an abutment for one end of a spring 233, the opposite end of which abuts another stamping 234 to urge said stamping 234 into contact with a plate 235, thus urging said plate 235 into frictional contact with the end 236 of the spring clutch 229. Another stamping 237 is formed with a flared face 237', and a ball 238 is received between said face 237' and a radial flange on the stamping 234. When the drum 228 is rotated, the ball 238 will move radially outward under the influence of centrifugal force, and, riding on the face 237', will force the stamping 234 to the left, as seen in Fig. 21, compressing the spring 233 and removing the pressure thereof from the plate 235. As soon as the car stops, and if the gears are meshed to drive the car up the hill, any retrograde movement will be prevented because at this time the spring 233 exerts a pressure on the plate 235 which, due to the fact that said plate is in contact with the free end of the spring 229, causes this spring to wrap up and start its self-energizing action and grip the drum 228, thereby preventing rotation of the shaft 227, the spring 229 being anchored in the plate 231 by means of a bolt 240 or the like. A manually operated release lever 241 is adapted to be pressed against the plate 235 for relieving the frictional contact between the plate 235 and the end of the spring 229.

In Fig. 22 I have shown a modified form of this combination and have located it on the main driven shaft of the transmission. Inasmuch as this shaft is driven either backward or forward, it is necessary that it shall be released and the frictional pressure on the end of the spring clutch shall be relieved when the car is driven backward, and this can be done by a mechanism similar to that shown for the release of the automatic band brake in Fig. 2, or by mechanism similar to that disclosed in Fig. 30, which will be described hereinafter.

In this Fig. 22, the shaft 227a is the driven shaft of the transmission and has mounted thereon, so as to rotate therewith, a drum 227b, the end of which has a cupped beveled surface 227c engageable with the ball 238a, which ball is held in engagement with the beveled surface by means of the spring 233a acting against the retainer member 238b, which member is provided with a flange 238c in operative relation to the lever 241. Surrounding the drum 227b is a spring clutch member having an internal diameter slightly greater than the diameter of the drum and has one end 227e thereof anchored in the housing. The other end is in intimate engagement with the flange 238c, due to the action of the spring 233a.

When the shaft 227a is stationary, the pressure of the flange 238c against the end of the spring clutch 227d will cause the spring to wrap up and grip the drum 227b on reverse rotation of the shaft 227a, thereby preventing the shaft from turning further. When the vehicle is being driven forwardly, the centrifugal force of the balls 238a acting on the beveled surface of the drum, pushes the flange member 238c away from engagement with the end of the spring 227d, thereby eliminating any generation of heat in forward driving.

In order to permit the vehicle to be driven rearwardly, the lever 231 is moved counter-clockwise, thereby releasing the flange 238c from engagement with the end of the spring, which prevents the spring from wrapping up when the flange is so separated. A suitable connection from the lever 241 to the reverse shifting mechanism is necessary to accomplish this.

In Fig. 23 I have shown a modified form of this centrifugal device and spring clutch combination wherein a stationary drum 242 is held from rotating by a bolt 243 or the like and has surrounding it a spring clutch 244 which has an internal diameter slightly greater than the external diameter of the drum, and which also surrounds a drum 245 mounted on the end of the countershaft 246 and adapted to turn therewith. Mounted also on the countershaft 246 is a centrifugal device comprising a generally conical stamping 247 adapted to cooperate with the conical end 248 of the spring clutch 244. The other end of the spring clutch 249 is also tapered to cooperate with a correspondingly shaped portion of a fixed member 250. When the car is at rest, the spring 251 forces the conical surfaces 248 and 249 into frictional engagement, and any subsequent undesired rotation of the countershaft gears 252 will be prevented by the wrapping action of this spring clutch.

This design might be modified by making the drum 245 slightly smaller than the internal diameter of the spring 244, as is done in this case, and by making the drum 242 slightly larger in diameter than the spring clutch, and, when used in combination with the cone 249, a minimum number of coils would be necessary in that part of the spring clutch which is in contact with the drum 242. Instead of using the cone 249, the end of the spring clutch could be anchored in a manner similar to that shown in Figs. 13 or 15, or in any other satisfactory manner.

In Fig. 24 I have shown this spring clutch centrifugal device combination as mounted on a countershaft gear cluster 253 between second speed gears 254 and 253. The spring clutch 255 has an internal diameter slightly greater than the diameter of the drum 256 and has one end anchored to the transmission case, as shown at 257. The other end of the spring clutch is frictionally engaged by the plate 258, due to the pressure exerted by the spring 259. When the car is being driven, the pressure of the spring 259 against the plate 258 is removed by the centrifugal action of the balls 260, thereby preventing drag of the spring clutch on its drum when the car is being driven. A release member 261 is provided for release of the sprag when it is holding the car and is connected preferably to be actuated with the foot brake of the vehicle, as shown in Fig. 7. Of course it will be obvious that the shifting mechanism can be used to release the sprag in any of the previously described organizations wherein the sprag is mounted on a unidirectional shaft of the transmission or its equivalent.

Fig. 25 shows this spring clutch and centrifugal device combination mounted so as to be operated by undesired movement of the reverse idler gear of the transmission. In this arrangement, the reverse idler gear 262 is keyed to the shaft 263, said shaft further having keyed thereon a drum 264. A centrifugal device 265 is also keyed to the shaft 263, the operation thereof being broadly similar to the operation of the devices illustrated in Figs. 21 to 24, inclusive. The spring clutch 266 has formed thereon a lug 267 which is anchored in the slot 268 to prevent rotation of the reverse idler gear in a direction opposite to normal. The operation of this arrangement is obvious.

In Fig. 26 I have shown a spring clutch alone, mounted between the countershaft gear 269 and the second speed gear 270. Gear 269 is keyed to the extension of the gear 270 at 271. The spring clutch 272 is anchored in the transmission case at 273 and has an internal diameter slightly less than the external diameter of the drum 274, which drum is a part of the gear 269. A release rod 275 is adapted to be operated by a lever 276 (Fig. 27), which lever is connected to a separate pedal. In this arrangement the release lever 276 can be connected to a separate operating means, inasmuch as it is designed so that the sprag cannot be applied suddenly, as will be more fully explained. The release rod 275 is provided with a notch 275' which is adapted to receive the free end 277 of the spring clutch 272. It can readily be seen that, when the release lever is rotated in a clockwise direction, it will cause the spring clutch to unwind, due to pressure being transferred to the end 277 of the spring clutch from the rod 275. I have provided a mechanism to keep this spring unwound and consequently keep the sprag free from holding the car until the countershaft cluster gears 270 are rotated in a normal direction, thereby preventing the sudden application of the sprag in a case where the car is moving downgrade with the gears set to drive it up the hill. This is a situation which may often arise when a release is used which is not connected to the brake operating means.

Referring now more particularly to this mechanism, I have provided a ratchet member 278 which is formed, in this case, as a part of the gear 270. A pawl 279 is pivoted on a rod 280 at 280' in such a way that it may have a limited degree of clockwise rotation from its illustrated position, being limited in such movement by the face 281; said pawl cannot turn in a counter-clockwise direction, being held against such movement by the face 282. The rod 280 has an enlargement 283 adapted to enter the notch 284 formed in the rod 275. It will be seen that, when the release lever is operated, shifting the rod 275 toward the left, as seen in Fig. 27, to unwind the spring clutch, the notch 284 is moved into registry with the plunger 283, and said plunger drops into said notch under the influence of the spring 285, thereby locking the rod 275 against return movement. As the plunger 283 slips into the notch 284, the pawl 279 is moved into position to be engaged by the ratchet teeth 278 when the ratchet turns in a clockwise direction, such being the normal direction of rotation of the countershaft when driving a car either backward or forward.

As has previously been explained, if the car is stopped in gear on a hill and the sprag takes hold and if it is desired to change the gear to a different speed ratio, it will be necessary to release the sprag in order to take the load off the gear teeth. To do this, the release mechanism is operated, which permits the plunger 280 to drop, thus moving the pawl to a position to be engaged by the ratchet teeth. Thus the plunger 280 will be returned to the illustrated position as soon as the drive shaft is moved forward. When the plunger end 283 is in the notch 284 and the gears are so meshed as to drive the car in one direction, any retrograde movement of the gears will cause the pawl 279 to move about its pivot 280' and to click over the teeth 278, so that the sprag cannot be reset while the car is moving under these conditions. However, if the gears are set to drive the car uphill, the sprag being in released condition, and if it is desired to have the sprag hold the car to facilitate starting up the grade, it is merely necessary to apply the foot brake to hold the car momentarily, set the gears in neutral position, and engage the clutch momentarily to cause the ratchet 278 to rotate in its normal direction to engage the pawl 279 and pull the enlarged member 283 out of the notch 284.

thus permitting the spring clutch to wind up again and prevent any retrograde movement of the car after the gears are meshed to drive it up the hill. Instead of using the spring clutch 272 alone, it may be used in connection with a roller clutch or pawl and ratchet device, as shown in numerous other figures in this application.

Fig. 28 illustrates a transmission comprising a casing 440 in one wall of which is journaled an end of a drive shaft 441, the same being mounted in a ball bearing 442. Said end of the drive shaft carries within the casing a drive pinion 443. A driven shaft 444 is journaled in a ball bearing 445 in the opposite wall of casing 440, and carries without the casing a plate 446 for connection with a propeller shaft of the vehicle. The opposite end of the driven shaft 444 is reduced as at 447 and is journaled in a socket 448 in the end of the drive shaft 441. A countershaft 449 is journaled in the casing 440 in parallelism with the drive and driven shafts, and carries a spool or cluster 450 comprising a gear 451 constantly meshing with the drive pinion 443. Said spool 450 also carries a second speed pinion 452, a low speed pinion 453 and a reverse pinion 454.

As will be obvious, the section of Fig. 28 is taken in two planes, whereby the shaft 455 on which is journaled the reverse idler 293 is made to appear to lie substantially in the plane defined by the shafts 444 and 449. As will be understood, however, the axes of the shafts 444, 449 and 455 actually form a triangle. The reverse pinion 454 is constantly in mesh with the reverse idler 293.

Splined on the shaft 444 is a gear 456 provided with internal teeth 457 adapted to be meshed with the teeth of the drive pinion 443 to provide a direct driving connection between the drive shaft 441 and the driven shaft 444. Said gear 456 is further provided with external teeth 458 adapted to be meshed with the teeth of the pinion 452 for establishing a second speed driving connection between the drive shaft 441 and the driven shaft 444, it being understood that a shifter fork (not shown) is adapted to be engaged with the collar 459 of the gear 456. A second gear 460 is also splined on the driven shaft 444, said gear being adapted to be shifted by a shifter fork (not shown) engaging the collar 461 thereof, selectively into mesh with the low speed drive pinion 453, or with the reverse idler 293.

In this figure I have shown the spragging device mounted as optional equipment on the transmission, or as an accessory. It is to be understood, however, that the spragging device may be mounted in this way, or, if desired, it may be built into the transmission case, as was shown on previous designs. A gear 291 is keyed on the shaft 292 and meshes with the reverse idler gear 293 of the transmission assembly. The shaft 292 is journaled at 294 and 295 to turn therein and has a cam member 296 keyed thereto at 297. This cam member is adapted to cooperate with the shell 298 of the roller clutch through the rollers 299. The shell 298 is formed integrally with the brake drum 288', or is otherwise attached thereto. The drum 288' is freely mounted on the shaft 292 at 300 and is prevented from turning in one direction by the action of the automatic band brake 301, the action of which has been fully explained in connection with Figs. 1 and 2. The automatic band brake 301 is held in constant engagement with the drum 288' by means of the bell crank 302 and a spring 304, as shown in Fig. 29, so as to be ready at all times to prevent any movement of the vehicle of such character as to cause rotation of the drum 288' in a counter-clockwise direction, as seen in Fig. 29. A release rod 303 is adapted to cooperate with the bell crank 302 and is connected preferably either to the hand brake or to the foot brake, although it may be connected to a separate lever and used in connection with a releasing device such as that described in connection with Figs. 26 and 27, which device will prevent the sprag from being reset after being released until the gear 291 and those meshing with it are caused to turn in their normal direction. Obviously, the spring 304 will hold the band brake 301 in contact with the drum at all times except when the sprag release mechanism is operated.

Fig. 30 shows a sprag arrangement that automatically operates regardless of whether the transmission is set in forward, reverse, or in neutral position, with the car facing uphill. This operation is obtained by placing a one-way device and release on the main shaft of the transmission, said device being releasable by the shift mechanism for reverse operation and which will remain in released condition until the car moves forward; and in addition to this, I have placed another one-way device on the reverse idler, to prevent retrograde movement when it is desired to drive the car up a hill in reverse. This device on reverse idler will prevent backward movement of the car when the gears are shifted to a forward speed after driving in reverse.

In Fig. 30, 305 represents the main shaft or propeller shaft of the transmission and has keyed thereto a roller clutch cam 305'. This cam cooperates with the shell 306 through the medium of the rollers 307 to prevent rotation of the shaft 305 except in a forward direction.

The shell 306 is provided with a drum portion 308 which has an outside diameter slightly larger than the inside diameter of the spring clutch 309, which clutch has one end 310 anchored in the slot 311 formed in the casing wall or in some other stationary element. The other end of the spring clutch is adapted to be unwound, by rotation of the lever 312 pinned to the shaft 313 (Figs. 30 and 32), to remove or reduce its radial contact with the drum 308, so that said drum may rotate reversely when it is desired to have the car move backward.

The shaft 313 also carries a lever 314, the arrangement being such that counter-clockwise rotation of said lever, as viewed in Fig. 32, moves the lever 312 in such direction as to release the spring clutch 309. The free end of lever 314 is disposed in the path of a plunger 316, said plunger being reciprocably mounted in the path of the reverse shift rail 315. The plunger 316 is provided with a pair of sockets 318 and 318' into either of which a ball 317 is adapted to be projected, said ball being urged toward such projection by suitable resilient means. As the rail 315 is moved to shift the gears of the transmission assembly into reverse-driving position, said rail engages the plunger 316 and moves the same to the right, as viewed in Fig. 30. Such movement, of course, first depresses the ball 317 and then brings the socket 318' into registry with said ball. Obviously, such movement of the plunger 316 will rotate the lever 314, thus releasing the grip of the spring 309 on the drum 308. A return of the transmission assembly to a neutral position will not result in a return movement of the lever 314, the plunger 316 being held in its sprag-releasing position by the engagement of the ball 317 in the socket 318'. Thus, the sprag will not be returned to operative condition until it is acted on by the mechanism now to be described.

A bell crank lever 319 is mounted on an axis perpendicular to the axis of the lever 314, and is disposed with its arm 320 in the path of movement of the lever 314. Thus, the sprag-releasing movement of the lever 314 effects a clockwise movement of the lever 319. The opposite arm 322 of said lever has connected thereto a rod 323 which carries at its lower end (see Fig. 31) a pawl 325. Said pawl is so mounted as to have a limited degree of rotation in a counter-clockwise direction about its pivot 321, but to be immovable in a clockwise direction beyond the position illustrated.

The above described movement of the lever 319 depresses the rod 323, thus moving the pawl 325 into the dotted-line position of Fig. 31, wherein it is disposed for engagement by the teeth 327 of a ratchet wheel 326 keyed to the shaft 305. With the pawl in this position, clockwise rotation of the shaft 305 will be permitted, the pawl clicking over the teeth 327 of the ratchet wheel 326. Counter-clockwise rotation of said shaft, however, will result in elevation of the rod 323, thus rotating the lever 319 in a counter-clockwise direction to return the lever 314 to the position illustrated in Fig. 30, such movement, of course, carrying with it the plunger 316 and bringing the socket 318 thereof into a position in which the ball 317 may enter said socket. The rod 323 is normally held in this position by a ball 328 urged by suitable resilient means into a socket 324 formed in said rod. With the parts in this position, the sprag is in operative condition, but it is to be noted that return of the sprag to its operative condition is dependent upon rotation of the shaft 305 in a direction to drive the vehicle forward.

It will thus be seen that the device illustrated in Figs. 30 to 32, inclusive, will normally prevent undesired reverse movement of the shaft 305; that it may be released to permit desired reverse movement of said shaft; and which, having been released, cannot be returned to operative condition except by forward movement of the vehicle. By this construction, any possibility of resetting the sprag while the vehicle is drifting backward and of thereby causing a sudden stop which might result in damage to the vehicle, is eliminated.

The device as so far described discloses a sprag or noback device which automatically prevents backward movement of a vehicle, and it will be noted that it is necessary to move the car forward to reset the device after it is released to drive the car backward and that the device retains its released condition until the car is moved forward, which means that after reversing the car, the operator does not have use of the sprag until after he has moved the car slightly forward. To overcome this difficulty, I have provided in addition to the above, an automatic one-way device on one of the unidirectional shafts of the transmission, and in this case I have shown it mounted on the shaft 330 for operation by the reverse idler gear 329. This device is quite similar to that shown on the shaft 305, except that the means for maintaining the device in released condition is not necessary. The release lever 331 is an emergency release and is preferably connected to the brake operating means in the manner of one or another of the devices previously described.

In Figs. 33 and 34, I have shown a modification wherein the reverse idler shaft 332 has keyed thereon a drum 333 which has an outside diameter slightly smaller than the inside diameter of the spring clutch 334, which clutch has one end anchored at 335. The other end 336 of said clutch is adapted to be operated by the rod 338 to grip the drum 333. This spring clutch is normally free on the drum 333 and will not prevent retrograde movement of the vehicle unless tightened by such movement of the rod 338, such movement being effected in this case by overshift movement of the gear shifting rails 339 and 340, as will now be explained.

The low and reverse shift rail 340, which is operated by the usual shift lever (not shown), is provided with a flat surface 341, against which the rod 338 has contact. This flat surface is of such a length in this case that, during the ordinary shifting of the gears, the sprag remains inoperative; i. e., the spring 334 is not tightened on its drum 333. However, if it is desired to bring the sprag into play in either low or reverse, the shift lever is moved still farther, and the cam portion 342 or 342' depresses the rod 338 and causes the spring clutch 334 to wrap about the drum 333 to hold the car.

The second and high speed shift rail 339 (see Fig. 35) has a cam portion 343 adapted to apply the sprag in second speed by overshift. I have not shown a cam on the other end of this rail, as a sprag in high gear is hardly needed. Obviously, however, it may be provided if desired. It is not necessary to have the sprag operable in second unless desired.

In Fig. 36, I have illustrated a modification of the above arrangement, the same comprising the provision of a narrow notch in the under surface of the reverse rail 346, the ends of said notch being formed as beveled faces 344 and 345. As will be obvious, this construction will result in setting the sprag just prior to the meshing of the gears for reverse driving or for low-speed driving, the initial movement of the rail 346 in either direction resulting in immediate depression of the rod 338.

In Fig. 37 I have shown a rail 347 for controlling the selection of high-speed and second-speed driving connections, said rail being formed with a cammed face 348 for cooperation with the upper end of the rod 338. The rail is shown in its neutral position, and it will be obvious that initial movement of said rail toward a second-speed driving connection will depress the rod 338, thus setting the sprag just prior to engagement of the second-speed driving gears.

When the modifications shown in Figs. 36 and 37 are used either separately or jointly, a release, preferably connected to the brakes, as previously explained, must be provided. In Fig. 34 I have shown a release rod 338' for this purpose.

In Fig. 38 I have shown an internal spring clutch wherein the spring 349 has an outside diameter slightly smaller than the inside diameter of the drums 350 and 351 and has one end anchored in a slot at 352. Adjacent the other end of said spring is a plate 353, urged into frictional contact therewith under the influence of the spring 354. This plate is caused to rotate with drum 351 and, when rotated by undesired reverse movement of the main shaft 355, causes the spring clutch 349 to unwind and grip the inside of the drum 351, which is keyed to the shaft 355, and also to grip the stationary drum 350, thereby arresting such rotation of the shaft 355. When it is desired to drive backward, the gears are shifted to reverse position, such shifting causing the reverse shift rail 356 to rotate the lever 357 in a clockwise direction, as viewed in Fig. 38. The end 470 of said lever cooperatively engages plate 358, whereby such rotation of said lever shifts plate 358 toward the left in Fig. 38. Plate 358 is tied to plate 353 by one or more pins 471, so that the described movement results in shifting the plate 353 away from the spring 349, compressing the spring 354 and removing the influence thereof from the end of the spring 349. Obviously, such a shift eliminates the frictional engagement between the plate 353 and the spring clutch 349, and consequently the spring clutch 349 will be ineffective to arrest reverse movement of the propeller shaft 355. The reverse release mechanism shown in Fig. 30, or its equivalent, may be used instead of that shown.

When the car is being driven forward, the balls 359, under the influence of centrifugal force, compress the spring 354 and remove the frictional engagement between the plate 353 and the spring clutch 349.

Fig. 39 discloses a spring clutch similar to that of Fig. 38, but mounted on the shaft 472 carrying the reverse idler gear 360. The release lever 361 of this embodiment is preferably connected to the hand brake or the foot brake lever.

In Figs. 40 and 41 is shown another modification operable by the reverse idler gear 370, said gear being provided with a drum 371, of slightly larger outside diameter than the internal diameter of the spring clutch 372. A second drum 373 is approximately the same diameter as the drum 371. A pin 374 may be used to anchor the end of the spring clutch to the drum 371 to reduce the number of coils required in the spring clutch.

The drum 373 is provided with ratchet teeth 375, adapted to cooperate with several pawls 376, which are preferably mounted in the staggered relationship shown in Fig. 5. The pawls 376 are pivoted in the housing 377, and each of said pawls is provided with spring friction members 378 which lift the pawl away from the ratchet teeth to prevent clicking when the car is moving forward, in which case the ratchet rotates in a counterclockwise direction, as viewed in Fig. 41. As will be obvious, the tendency of said friction members is to drag the pawl into engagement with the teeth 375 when the ratchet is rotated in the opposite direction by undesired movement of the vehicle, thereby arresting such movement. The spring clutch and the release device 379 are similar to those illustrated in Fig. 11.

Fig. 42 discloses a modification of the device illustrated in Fig. 40, in which the pawls 380 are pivoted in staggered relationship on a flange 473 carried by the reverse gear 381. Said pawls are prevented from clicking, by the fact that centrifugal force causes them to pull away from the ratchet teeth 381 and against stops (not shown). The drag of the friction members 382 causes the pawls to engage the ratchet whenever undesired rotation of the propeller shaft takes place when the car is in gear to drive it up the hill.

The release lever 383 is preferably connected to the foot brake. A device such as is shown in Fig. 42 may be used on the main shaft in conjunction with a reverse release mechanism of the type shown in Fig. 30.

Fig. 43 shows a spring clutch sprag on the propeller shaft, the arrangement being such that the sprag may be freed so as not to drag in high gear, either by shifting to high or by overshift in high gear. In either case, the lever 385 causes the spring clutch 386 to unwind under the influence of the high gear shift rail 387 when the same is moved in the direction of the arrow.

Fig. 44 is a modification of the device of Fig. 9, wherein I use a pawl and ratchet arrangement 388 instead of a roller clutch. The reverse shift rail 389 releases the sprag for reverse.

In Fig. 45 I have shown a spring clutch sprag 390 mounted on the front end of the countershaft. According to the construction herein illustrated, continued movement of the clutch-operating lever 391 beyond the limits of its normal throw is utilized to release the sprag.

As illustrated, the lower end 393 of the clutch-operating lever 391 is provided with a projection received in a slot 392 in a reciprocably mounted plunger 480. Said plunger is provided with a pair of sockets 399 and 399', with which cooperates a ball 398 urged toward entry into said sockets by a spring 395. An arm 396 is pinned to a rock shaft 482 and has its free end connected to the lower end of the plunger 480. A second arm 397, likewise pinned to the rock shaft 482, is disposed to engage the free end of the spring clutch 390.

The slot 392 is of such length as to accommodate the throw of the end 393 of the clutch lever 391 in the normal operation of said lever. Further movement of said lever, however, brings the end 393 thereof into engagement with the end 394 of said slot and shifts the plunger 480 upwardly, bringing the socket 399' into registry with the ball 398. Such movement of the plunger 480 rotates the arm 396, rock shaft 482, and arm 397 in a counter-clockwise direction, to unwind or release the spring clutch 390. The engagement of the ball 398 in the socket 399' retains the sprag in its released condition until the clutch has been reengaged. A means similar to that disclosed in Figs. 26 and 27 may be used if desired, to maintain the sprag in released condition until the countershaft is again moved in its normal direction.

In Fig. 46 I have shown on the main shaft of the transmission a modified form of device wherein a small spring clutch 500 which has an outside diameter slightly greater than the inside diameter of the drum 501 and which has one end 502 fastened to the end 503 of the main spring clutch 504. The other end 505 of the small spring clutch 500 is fastened to the release member 506, which member is provided with a lever 507, keyed thereto and operable to release the sprag for reverse drive. The function of the auxiliary spring clutch 500 is to cause the main spring clutch to unwind for sprag purposes, and said auxiliary clutch permits the use of a spring clutch 504 that has very little or no radial tension on its mating drums, thereby eliminating drag. It also can be used in lieu of additional coils on the main spring clutch 504.

In Figs. 47 and 48, I have shown the friction pawl and ratchet spring clutch combination on the main shaft 508 of a transmission assembly. In this design the ratchet 509 is keyed to the shaft 508 and is adapted to cooperate with the staggered pawls 510, which pawls are provided with spring friction members 511 adapted to be in frictional engagement at all times with the sides of the ratchet 509, so that when the vehicle and shaft 508 are moving, in a desired direction, said spring members 511 raise the pawls to prevent clicking thereof, and when the shaft 508 turns in the opposite direction, the friction members cause the pawls to engage the ratchet teeth. Such engagement results in a tendency to rotate the pawl carrying plate 512 backward, and such backward movement thereof is prevented by the action of the spring clutch 513, as previously described. When it is desired to drive the car backward, the release levers 514 and 515 are caused to rotate by the reverse shift mechanism which causes the spring clutch to unwind and permit reverse rotation of the shaft 508 and member 512.

In order to maintain the sprag released, a device such as is shown in Fig. 30 can be used, or I may use one of the type shown in Fig. 48, which device will now be explained.

The reverse shift rail 516 is provided with a flat portion 517 and with faces 518 and 519, which faces are adapted to contact the toggle mechanism 520 to throw it from one side of center to the other, a spring 521 being provided to urge said mechanism toward either of its extreme positions in a well-known manner.

The rail 516 is shown in its neutral position in which a ball 486 is resiliently held, under the influence of a spring 487, in a socket 484 in said rail. Said rail is adapted to be moved in the direction of the arrow to set the transmission unit in reverse-drive position, and such movement of the rail will bring the socket 485 into registry with the ball 486. Such movement of the rail further results in movement of the toggle mechanism 520 beyond its dead-center position, and as said mechanism passes its dead-center, the spring 521 comes into action to throw the toggle mechanism into contact with the pin 522. As will be obvious, such movement of the toggle causes counter-clockwise rotation of the lever 515 to release the sprag. Since the toggle mechanism is held in sprag-releasing position by the spring 521, the shift rail 516 may now be returned to its neutral position without resetting the sprag. In order to reset the sprag, the rail 516 must be shifted to a position in which the socket 483 registers with the ball 486, in which position of the rail the transmission unit is in low-speed driving position. Such movement of the rail 516 brings the face 519 thereof into engagement with the toggle mechanism 520 and shifts said mechanism beyond its dead-center, whereafter the spring 521 throws such mechanism into contact with the pin 523, thus releasing engagement of the lever 515 with the spring 513 and bringing the sprag into operative condition.

Preferably, the rail 524 is provided in its upper surface with three sockets 489, 490 and 491 arranged for cooperation with a ball 488, said ball preferably being under the influence of the above-mentioned spring 487.

Fig. 49 illustrates a modification of the device of Fig. 48 wherein the reverse shift rail 525 is adapted to release the sprag, when shifted to reverse position, as indicated by the arrow, by causing the rod 526 to unwind the spring under the influence of the cam 527. The ball 528 will then slip into the notch 529 and maintain the sprag released until the gears are shifted to a forward speed position, when the cam portion 530 engages the cam portion 531, thereby raising the release rod to the position shown in Fig. 49 and consequently resetting the sprag.

In Fig. 50, I have illustrated a further modification of the devices of Figs. 48 and 49. In this embodiment, the rail 525' controls the meshing of the reverse and low-speed drive gears and is provided with sockets 527', 528' and 529'. A ball 530' is urged by a spring 531' to enter said sockets. A plunger 526' is connected at its lower end to the sprag-releasing lever, and said plunger is formed with sockets 532 and 533 for cooperation with a ball 534 urged toward entry in said sockets by a spring 535. The upper end of said plunger is pivoted to one arm 536 of a bell crank lever, the opposite arm 537 of which is operatively received in a slot 538 in the end of the rail 525'. The rail is illustrated in its neutral position and is adapted to be shifted toward the right, as viewed in Fig. 50, to move the transmission assembly into reverse-drive position. As will be obvious, such movement brings the socket 529' into registry with the ball 530' and causes clockwise rotation of the bell crank lever to depress the plunger 526', bringing the socket 533 thereof into registry with the ball 534 and releasing the sprag. It will be obvious that return of the rail 525' to the illustrated position will not affect the plunger 526', but that movement of the rail 525' to a position in which the socket 528' registers with the ball 530' will return the plunger 526' to the illustrated position, at the same time bringing the transmission assembly into low-speed drive condition.

A further means of releasing the sprag, especially one as shown in Figs. 26 and 27, would be to selectively move a release lever in front of the clutch or brake pedal to be operated thereby.

It will be seen from the foregoing that I have provided a sprag that is foolproof, easily releasable when under load, and which cannot be reset, after being released, in such a manner as to cause any damage to the vehicle with which it is used, due to sudden stoppage of such vehicle.

In other words, I have provided a sprag which, after being released, can only be reset when the vehicle has little or no motion of the sort controlled by the sprag.

I claim as my invention:

1. In a transmission assembly having a driven shaft and means for driving said shaft selectively in opposite directions, a member keyed to said shaft and forming one element of a one-way clutch, a member rotatable on said shaft and forming another element of such clutch, friction operated self-wrapping means cooperable with said last-named member to arrest rotation thereof in one direction, and means for rendering said friction operated self-wrapping means ineffective.

2. In a transmission assembly having a driven shaft and means for driving said shaft selectively in opposite directions, a member keyed to said shaft and forming one element of a one-way clutch, a member rotatable on said shaft and forming another element of such clutch, friction operated self-wrapping means cooperable with said last-named member to arrest rotation thereof in one direction, and means actuable by the shifting mechanism of said transmission in certain positions thereof for rendering said self-wrapping means ineffective.

3. The combination with a transmission assembly including a shaft rotatable in opposite directions and an element normally rotatable in one direction only during rotation in either direction of said shaft, of a member rotatably mounted relative to said element, a one-way clutch connecting said element to drive said member only upon rotation of said element in an abnormal direction, and friction operated self-wrapping means cooperable with said member to arrest rotation thereof when said member is driven by said element.

4. In an automotive vehicle, means for selectively driving said vehicle forwardly and rearwardly, a spragging device comprising a drum, one-way clutch means associating said drum with a shaft of said driving means, a friction operated self-wrapping element associated with said drum for arresting rotation thereof when said drum is driven through said clutch, and means for rendering said self-wrapping element ineffective.

5. In an automotive vehicle, means for selectively driving said vehicle forwardly and rearwardly, a spragging device comprising a drum, one-way clutch means associating said drum with a shaft of said driving means, a friction operated self-wrapping element associated with said drum for arresting rotation thereof when said drum is driven through said clutch, and means actuated upon operation of said driving mechanism to drive said vehicle rearwardly, for rendering said self-wrapping element ineffective.

6. The combination with a shaft, of friction operated self-wrapping means for arresting rotation of said shaft in one direction, and means between said shaft and said self-wrapping means for preventing rotation of said shaft in the opposite direction from affecting said self-wrapping means.

7. In combination with a motor vehicle transmission, a shaft operatively associated with the road wheels of the vehicle, shift means whereby said transmission may be set for driving said vehicle forwardly and reversely, a differential band brake operatively associated with said shaft and adapted for preventing reverse rotation of said shaft when the transmission is set for driving the vehicle forwardly, said differential band brake being arranged relative to said transmission so as to be inoperable to prevent reverse movement of said shaft when the transmission is set for driving the vehicle reversely.

8. In combination with a motor vehicle transmission having a shaft operatively associated with the road wheels of the vehicle, friction operated self-wrapping means associated with said shaft and normally operable for arresting rotation thereof in one direction when said transmission is set for driving said vehicle in the opposite direction, and centrifugally operated means associated with said self-wrapping means and operable for preventing rotation of said shaft in said opposite direction from affecting said self-wrapping means.

9. The combination with a shaft, of a spring clutch anchored at its one end and loosely associated with said shaft, means rotatable with said shaft and resiliently urged into frictional engagement with the free end of said spring clutch to entrain said end with the movement of said shaft, and centrifugally operated means driven from said shaft for releasing such frictional engagement.

10. The combination with a shaft, of a spring clutch anchored at its one end and loosely associated with said shaft, means rotatable with said shaft and resiliently urged into frictional engagement with the free end of said spring clutch to entrain said end with the movement of said shaft, and means controlled by the speed of rotation of said shaft for releasing such frictional engagement.

11. In a motor vehicle transmission, a shaft operatively associated with the road wheels of the vehicle, shift means whereby said transmission may be set for driving said vehicle forwardly and reversely, a drum member rotatable with said shaft in at least one direction when said transmission is set for driving the vehicle forwardly, and a friction operated self-wrapping element cooperable with said drum member for gripping the same to prevent reverse rotation of said shaft, when the transmission is set for driving the vehicle forwardly, at least one end of said element being movable, said end of said self-wrapping element being operable in response to frictional engagement between the same and said drum member to cause said self-wrapping element to grip said drum member, said self-wrapping element being arranged to be inoperable to prevent reverse movement of said shaft when the transmission is set for driving the vehicle reversely, said self-wrapping element remaining inoperable even though the transmission is shifted from reverse to neutral while the vehicle is moving reversely.

12. In a motor vehicle transmission, a shaft operatively associated with the road wheels of the vehicle, shift means whereby said transmission may be set for driving said vehicle forwardly and reversely, a drum member rotatable with said shaft in at least one direction when the transmission is set for driving the vehicle forwardly and having a cylindrical clutch face, a friction operated self-wrapping element having a cylindrical clutch face cooperable with said cylindrical clutch face of said drum member for gripping the same for preventing reverse rotation of said shaft when the transmission is set for driving the vehicle forwardly, said self-wrapping element being adapted to grip said drum in response to frictional engagement between the drum and said self-wrapping element, said self-wrapping element being arranged relative to said transmission so as to be inoperable to prevent reverse movement of said shaft when the transmission is set for driving the vehicle reversely, said self-wrapping element remaining inoperable even though the transmission is shifted from reverse to neutral while the vehicle is moving reversely.

13. In a motor vehicle transmission, a shaft operatively associated with the road wheels of the vehicle, shift means whereby said transmission may be set for driving said vehicle forwardly and reversely, a cylindrical drum member rotatable with said shaft in at least one direction when said transmission is set for driving said vehicle forwardly, a friction operated self-wrapping flexible band cooperable with said drum member for gripping the same to prevent reverse rotation of the shaft when the transmission is set for driving the vehicle forwardly, a movable bell crank, the ends of said self-wrapping band being connected to the ends of said bell crank, said self-wrapping band being arranged to be inoperable to prevent reverse movement of said shaft when the transmission is set for driving the vehicle reversely.

14. In a motor vehicle transmission, a shaft operatively associated with the road wheels of the vehicle, a drum member rotatable with said shaft in at least one direction, a friction operated self-wrapping element frictionally engageable with said drum for preventing rotation of said shaft in one direction when the transmission is set for driving said shaft in the opposite direction, shift means whereby said transmission may be set for driving said vehicle in either direction, a connection between said shift means and said self-wrapping element which, upon manipulation of said shift means to set said transmission for driving said shaft in said one direction, operates to render said self-wrapping element inoperative, said connection being constructed and arranged relative to said self-wrapping element so that said self-wrapping element is capable of being released by manipulation of said shift means when said self-wrapping element is subjected to the maximum load of the vehicle.

15. In a motor vehicle transmission, a shaft operatively associated with the road wheels of the vehicle, a shifting device whereby said transmission may be set for driving said vehicle forwardly and reversely, a drum member rotatable with said shaft in at least one direction when the transmission is set for driving the vehicle forwardly, a friction operated self-wrapping member cooperable with said drum member for preventing reverse rotation of the shaft when the transmission is set for driving the vehicle forwardly, said self-wrapping member being arranged relative to said transmission so as to be inoperable to prevent reverse movement of said shaft when the transmission is set for driving the vehicle reversely, and means associated with said transmission, drum member and self-wrapping member for eliminating the frictional drag between said drum member and self-wrapping member when said shaft is rotating in a forward direction.

16. In a motor vehicle, a transmission, a shaft operatively associated with the road wheels of the vehicle, shift means for arranging said transmission for driving said vehicle forwardly and reversely, holding means operatively associated with said shaft and automatically operable for preventing movement of said vehicle in one direction when the transmission is arranged for driving said vehicle in the other direction, means operatively associated with said holding means for preventing movement of said vehicle in said other direction from affecting said holding means, and means operable independently of said shift means for rendering said holding means inoperative.

17. In a motor vehicle, a drive system including a clutch, a transmission, and a shifting device therefor, a shaft operatively associated with the road wheels of the vehicle and with said clutch, a pedal operable for controlling engagement and disengagement of said clutch so as to control the drive between the motor of said vehicle and the road wheels thereof, holding means operatively associated with the road wheels of said vehicle and operable for preventing down hill movement thereof, and a connection between said holding means and said pedal operable independently of the position of said shifting device upon extended movement of said pedal beyond that required for disengaging said clutch for controlling said holding means.

18. In a motor vehicle, a drive system including a clutch providing a breakable connection between the motor of said vehicle and the road wheels thereof, a pedal operable for disengaging and engaging said clutch so as to control the drive between the motor of said vehicle and the road wheels thereof, holding means operatively associated with the road wheels of said vehicle and operative for preventing down hill movement thereof in either direction, said pedal being capable of extended movement beyond that which disengages said clutch, and means actuated by said pedal upon said extended movement thereof for controlling said holding means.

19. In a motor vehicle, a shaft operatively connected to the road wheels of said vehicle, friction operated self-wrapping means for arresting rotation of said shaft in one direction, and means operatively associated with said self-wrapping means for preventing rotation of said shaft in the opposite direction from affecting said self-wrapping means.

20. In a motor vehicle transmission, a shaft operatively associated with the road wheels of the vehicle, shift means whereby said transmission may be set for driving said vehicle forwardly and reversely, a drum member rotatable with said shaft in at least one direction when the transmission is set for driving said vehicle forwardly, and a friction operated self-wrapping member cooperable with said drum member for preventing reverse rotation of the shaft when the transmission is set for driving the vehicle forwardly, said self-wrapping member being arranged so as to be inoperable to prevent reverse movement of said shaft when the transmission is set for driving the vehicle reversely, and means operatively associated with at least one of said members for preventing rotation of said shaft in the opposite direction from affecting said self-wrapping member.

21. In a motor vehicle transmission, a shaft operatively associated with the road wheels of the vehicle, shift means whereby said transmission may be set for driving said vehicle forwardly and reversely, a drum member rotatable with said shaft in at least one direction, and a friction operated self-wrapping member cooperable with said drum member for preventing reverse rotation of the shaft when the transmission is set for driving the vehicle forwardly, said self-wrapping member being arranged so as to be inoperable to prevent reverse movement of said shaft when the transmission is set for driving the vehicle reversely, and automatic means operable for maintaining said self-wrapping member inoperable.

22. In combination with a motor vehicle transmission, a shaft operatively associated with the road wheels of the vehicle, shift means whereby said transmission may be set for driving the vehicle forwardly and reversely, a drum member rotatable with said shaft in at least one direction when said transmission is set for driving the vehicle forwardly, and a friction operated self-wrapping member cooperable with said drum member for gripping the same to prevent reverse rotation of said shaft when the transmission is set for driving the vehicle forwardly, at least one end of said self-wrapping member being movable, said end of said self-wrapping member being operable solely in response to frictional engagement between the same and said drum member to cause said self-wrapping member to grip said drum member, said self-wrapping member being arranged so as to be inoperable to prevent reverse movement of said shaft when the transmission is set for driving the vehicle reversely, and means operatively associated with at least one of said members for preventing forward rotation of said shaft from affecting said self-wrapping member.

23. In combination with a motor vehicle transmission, a shaft operatively associated with the road wheels of the vehicle, shift means whereby said transmission may be set for driving the vehicle forwardly and reversely, a drum member rotatable with said shaft in at least one direction when said transmission is set for driving the vehicle forwardly, and a friction operated self-wrapping member cooperable with said drum member for gripping the same to prevent reverse rotation of said shaft when the transmission is set for driving the vehicle forwardly, at least one end of said self-wrapping member being movable, said end of said self-wrapping member being operable in response to frictional engagement between the same and said drum member to cause said self-wrapping member to grip said drum member, said self-wrapping member being arranged so as to be inoperable to prevent reverse movement of said shaft when the transmission is set for driving the vehicle reversely, said self-wrapping element remaining inoperable even though the transmission is shifted from reverse to neutral while the vehicle is moving reversely and means operable independently of operation of said shift means for rendering said self-wrapping member inoperable.

24. In combination with a motor vehicle transmission, a shaft operatively associated with the road wheels of the vehicle, shift means whereby said transmission may be set for driving the vehicle forwardly and reversely, a drum member rotatable with said shaft in at least one direction when said transmission is set for driving the vehicle forwardly, and a friction operated self-wrapping member cooperable with said drum member for gripping the same to prevent reverse rotation of said shaft when the transmission is set for driving the vehicle forwardly, at least one end of said self-wrapping member being movable, said end of said self-wrapping member being operable solely in response to frictional engagement between the same and said drum member to cause said self-wrapping member to grip said drum member, said self-wrapping member being arranged so as to be inoperable to prevent reverse movement of said shaft when the transmission is set for driving the vehicle reversely, and automatic means operable for maintaining said self-wrapping member inoperable.

25. In combination with a motor vehicle transmission, a shaft operatively associated with the road wheels of the vehicle, shift means whereby said transmission may be set for driving said vehicle forwardly and reversely, a differential band brake operatively associated with said shaft and adapted for preventing reverse rotation of said shaft when the transmission is set for driving the vehicle forwardly, said differential band brake being arranged so as to be inoperable to prevent reverse movement of said shaft when the transmission is set for driving the vehicle reversely, and means operatively associated with said differential band brake for preventing forward rotation of said shaft from affecting said differential band brake.

26. In combination with a motor vehicle transmission, a shaft operatively associated with the road wheels of the vehicle, shift means whereby said transmission may be set for driving said vehicle forwardly and reversely, a differential band brake operatively associated with said shaft and adapted for preventing reverse rotation of said shaft when the transmission is set for driving the vehicle forwardly, said differential band brake being arranged so as to be inoperable to prevent reverse movement of said shaft when the transmission is set for driving the vehicle reversely, and means operable independently of operation of said shift means for rendering said differential band brake inoperable.

27. In combination with a motor vehicle transmission, a shaft operatively associated with the road wheels of the vehicle, shift means whereby said transmission may be set for driving said vehicle forwardly and reversely, a drum member rotatable with said shaft in at least one direction when the transmission is set for driving the vehicle forwardly and having a cylindrical clutch face, and a friction operated self-wrapping member having a cylindrical clutch face cooperable with said cylindrical clutch face of said drum member for gripping the same for preventing reverse rotation of said shaft when the transmission is set for driving the vehicle forwardly, said self-wrapping member being adapted to grip said drum member solely in response to frictional engagement between said drum member and said self-wrapping member, said self-wrapping member being arranged so as to be inoperable to prevent reverse rotation of said shaft when the transmission is set for driving the vehicle reversely, and means operatively associated with at least one of said members for preventing forward rotation of said shaft from affecting said self-wrapping member.

28. In combination with a motor vehicle transmission having a shaft operatively associated with the road wheels of the vehicle, shift means whereby said transmission may be set for driving said vehicle forwardly and reversely, a differential band brake operatively associated with said shaft and operable for preventing reverse rotation of said shaft when the transmission is set for driving the vehicle forwardly, said differential band brake being arranged relative to said transmission so as to be inoperable to prevent reverse rotation of said shaft when the transmission is set for driving the vehicle reversely, means operatively associated with said transmission, shaft and band brake for eliminating the frictional drag of said band brake upon the rotation of said shaft due to forward movement of said vehicle, and means cooperable with said band brake for holding the same in an inoperable condition even though the transmission may be set for driving the vehicle forwardly.

29. In combination with a motor vehicle transmission, a shaft operatively associated with the road wheels of the vehicle, shift means whereby said transmission may be set for driving said vehicle forwardly and reversely, a drum member rotatable with said shaft in at least one direction when the transmission is set for driving the vehicle forwardly and having a cylindrical clutch face, and a friction operated self-wrapping member having a cylindrical clutch face cooperable with said cylindrical clutch face of said drum member for gripping the same for preventing reverse rotation of said shaft when the transmission is set for driving the vehicle forwardly, said self-wrapping member being adapted to grip said drum member solely in response to frictional engagement between said drum member and said self-wrapping member, said self-wrapping member being arranged so as to be inoperable to prevent reverse rotation of said shaft when the transmission is set for driving the vehicle reversely, and automatic means operable for maintaining said self-wrapping member inoperable.

30. In combination with a motor vehicle transmission, a shaft operatively associated with the road wheels of the vehicle, shift means whereby said transmission may be set for driving said vehicle forwardly and reversely, a drum member rotatable with said shaft in at least one direction when said transmission is set for driving said vehicle forwardly, a friction operated self-wrapping band member cooperable with said drum member for gripping the same to prevent reverse rotation of said shaft when the transmission is set for driving the vehicle forwardly, a movable member, the ends of said self-wrapping band member being connected to said movable member, said self-wrapping band member being arranged to be inoperable to prevent reverse rotation of said shaft when the transmission is set for driving the vehicle reversely, and means operatively associated with at least one of said members for preventing forward rotation of said shaft from affecting said self-wrapping member.

31. In combination with a motor vehicle transmission, a shaft operatively associated with the road wheels of the vehicle, shift means whereby said transmission may be set for driving said vehicle forwardly and reversely, a drum member rotatable with said shaft in at least one direction when said transmission is set for driving said vehicle forwardly, a friction operated self-wrapping band member cooperable with said drum member for gripping the same to prevent reverse rotation of said shaft when the transmission is set for driving the vehicle forwardly, a movable member, the ends of said self-wrapping band member being connected to said movable member, said self-wrapping band member being arranged to be inoperable to prevent reverse rotation of said shaft when the transmission is set for driving the vehicle reversely, and means operable independently of operation of said shift means for rendering said self-wrapping member inoperable.

32. In combination with a motor vehicle transmission, a shaft operatively associated with the road wheels of the vehicle, shift means whereby said transmission may be set for driving said vehicle forwardly and reversely, a drum member rotatable with said shaft in at least one direction when said transmission is set for driving said vehicle forwardly, a friction operated self-wrapping band member cooperable with said drum member and normally operable for gripping the same to prevent reverse rotation of said shaft when the transmission is set for driving the vehicle forwardly, a movable member, at least one of the ends of said self-wrapping band member being associated with said movable member so as to be moved thereby upon movement thereof for rendering said self-wrapping member operable and inoperable, said self-wrapping band member being arranged relative to the transmission so as to be inoperable to prevent reverse rotation of said shaft when the transmission is set for driving the vehicle reversely, and means cooperable with said movable member for holding said self-wrapping member in an inoperable condition even though the transmission may be set for driving the vehicle forwardly.

33. In combination with a motor vehicle transmission, a shaft operatively associated with the road wheels of the vehicle, a drum member rotatable with said shaft in at least one direction, a friction operated self-wrapping member frictionally engageable with said drum member for preventing rotation of said shaft in one direction when the transmission is set for driving said shaft in the opposite direction, shift means whereby said transmission may be set for driving said vehicle in either direction, said shift means being arranged to render said self-wrapping member inoperative when it is desired to drive said shaft in said one direction, said self-wrapping member being adapted to be released by said shift means when said self-wrapping member is subjected to the load of said vehicle, and means operatively associated with at least one of said members for preventing rotation of said shaft in said opposite direction from affecting said self-wrapping member.

34. In combination with a motor vehicle transmission, a shaft operatively associated with the road wheels of the vehicle, a drum member rotatable with said shaft in at least one direction, a friction operated self-wrapping member frictionally engageable with said drum member for preventing rotation of said shaft in one direction when the transmission is set for driving said shaft in the opposite direction, shift means whereby said transmission may be set for driving said vehicle in either direction, said shift means beng arranged to render said self-wrapping member inoperative when it is desired to drive said shaft in said one direction, said self-wrapping member being adapted to be released by said shift means when said self-wrapping member is subjected to the load of said vehicle, and automatic means operable for maintaining said self-wrapping member inoperable.

35. In combination with a motor vehicle transmission, a shaft operatively associated with the road wheels of said vehicle, shift means whereby said transmission may be set for driving said vehicle forwardly and reversely, means cooperable with said shaft for preventing reverse rotation thereof when the transmission is set for driving the vehicle forwardly, said means being arranged so as to be inoperable to prevent reverse rotation of said shaft when the transmission is set for driving the vehicle reversely, said means comprising a pawl and ratchet mechanism which includes a plurality of pawls arranged in staggered relationship with respect to the teeth of the ratchet.

36. In combination with a motor vehicle transmission, a member operatively associated with the road wheels of said vehicle, a holding member, a shifting device whereby said transmission may be set for driving said vehicle forwardly and reversely, mechanism cooperable with said members for preventing reverse movement of said vehicle when the transmission is set for driving the vehicle forwardly, said mechanism being arranged so as to be inoperable to prevent reverse movement of said vehicle when the transmission is set for driving the vehicle reversely, said mechanism comprising pawl and ratchet means, one part of said means being operatively connected to one of said members, a one-way connection between another part of said means and the other of said members, and means operable independently of said shifting device for breaking said one-way connection.

37. In combination with a motor vehicle transmission having a shaft operatively connected to the road wheels of the vehicle, means for setting said transmission for selectively driving said vehicle in opposite directions, a member keyed to said shaft and forming one element of a one-way clutch, a member rotatable on said shaft and forming another element of such clutch, friction operated self-wrapping means cooperable with said last-named member to arrest rotation thereof in one direction, and means for rendering said friction operated self-wrapping means ineffective.

38. In a motor vehicle, a drive system including a clutch, a shaft operatively associated with the road wheels of the vehicle and with said clutch, a pedal operable for controlling engagement and disengagement of said clutch so as to control the drive between the motor of said vehicle and the road wheels thereof, holding means operatively associated with the road wheels of said vehicle and operable for preventing down hill movement thereof, and a connection between said holding means and said pedal operable upon extended movement of said pedal beyond that required for disengaging said clutch for controlling said holding means.

39. In a motor vehicle, a drive system including a clutch providing a breakable connection between the motor of said vehicle and the road wheels thereof, a pedal operable for disengaging and engaging said clutch so as to control the drive between the motor of said vehicle and the road wheels thereof, holding means operatively associated with the road wheels of said vehicle and operative for preventing down hill movement thereof, said pedal being capable of extended movement beyond that which disengages said clutch, and means actuated by said pedal upon said extended movement thereof for controlling said holding means.

40. A motor vehicle having a drive system including a clutch, a transmission having a forward and reverse drive positions, a shifting device operable for selectively arranging said transmission in forward or reverse drive position, a pedal operable for engaging and disengaging said clutch so as to control the drive between the motor of said vehicle and the road wheels therein, in combination with holding means operatively associated with the road wheels of said vehicle and operable for preventing downhill movement thereof in both forward and reverse directions, and means actuated by said clutch pedal upon movement thereof for controlling said holding means.

41. A motor vehicle having driving means including a transmission having forward and reverse drive and neutral positions, a clutch engageable and disengageable to control the driving means, and a clutch pedal for operating said clutch, in combination with mechanism operatively associated with the driving means of said vehicle and operable thereon to prevent retrograde movement of said vehicle, said mechanism being operable by retrograde rolling movement of a part of said vehicle due to gravity, and means operable by movement of said clutch pedal when said transmission is arranged in forward gear position for rendering said gravity actuated means operable and inoperable.

42. A motor vehicle having a drive system including a clutch, a transmission having a forward and reverse drive positions, a shifting device operable for selectively arranging said transmission in forward or reverse drive position, a shaft operatively associated with the road wheels of the vehicle and with said clutch, a pedal operable for engaging and disengaging said clutch so as to control the drive between the motor of the vehicle and the road wheels thereof, in combination with holding means operatively associated with the road wheels of said vehicle and said shaft and operable for preventing downhill movement thereof in a reverse direction when said transmission is arranged in forward drive position and the vehicle is facing uphill, and a device, operatively associated with said holding means and said pedal, constructed and arranged for controlling said holding means, upon movement of said pedal when said transmission is arranged in forward drive position.

43. A motor vehicle having a drive system including a clutch, a transmission having forward and reverse drive positions, a shifting device operable for selectively arranging said transmission in forward or reverse drive position, a shaft operatively associated with the road wheels of the vehicle and with said clutch, a pedal operable for engaging and disengaging said clutch so as to control the drive between the motor of the vehicle and the road wheels thereof, in combination with holding means operatively associated with the road wheels of said vehicle and said shaft and operable for preventing downhill movement thereof in a reverse direction when said transmission is arranged in forward drive position and the vehicle is facing uphill, and a device, operatively associated with said holding means and said pedal, constructed and arranged for releasing said holding means, upon movement of said pedal when said transmission is arranged in forward drive position.

44. A motor vehicle having a drive system including a clutch, a transmission having forward and reverse drive positions, a shifting device operable for selectively arranging said transmission in forward or reverse drive position, a pedal operable for engaging and disengaging said clutch so as to control the drive between the motor of said vehicle and the road wheels thereof, in combination with holding means operatively associated with the road wheels of said vehicle and operable for preventing downhill movement thereof in a reverse direction when the vehicle is facing uphill, and means actuated by movement of said pedal in one direction from clutch disengaged position thereof for releasing said holding means.

45. A motor vehicle having a drive system including a shaft, a transmission including a member shiftable in one direction to set up a drive between the motor and drive wheels of said vehicle, a friction operated band mechanism associated with said shaft and operable for preventing retrograde movement of said vehicle, and a connection between said member and said mechanism for rendering said mechanism operative by an overshifting movement of said member in said one direction without changing the transmission setting.

46. A motor vehicle having a drive system including a shaft, a transmission including a member shiftable in one direction to set up a drive between the motor and drive wheels of the vehicle, a friction operated band mechanism associated with said shaft and operable for preventing retrograde movement of said vehicle, a connection between said member and said mechanism for rendering said mechanism operative by an overshifting movement of said member in said one direction without changing the transmission setting, and other means for releasing said mechanism when the same is operative.

47. A motor vehicle having a drive system including a transmission providing forward and reverse drive and neutral positions in combination with brake mechanism including a foot-operated applying means, gravity actuated means to prevent downhill retrograde movement of the vehicle and operable when the transmission is arranged in either forward or reverse drive or neutral positions, means for rendering said gravity actuated means inoperable when it is desired to drive reversely, said gravity actuated means being constructed and arranged so that the same may be maintained inoperable when the transmission is arranged in neutral position.

48. In combination with the drive system of a motor vehicle having a shaft operatively connected with the road wheels of the vehicle, a mechanism operatively associated with said shaft and operable for preventing downhill movement of said vehicle when it is facing uphill on an incline, said mechanism comprising an element adapted to be rotated in at least one direction with said shaft when the vehicle tends to move downhill, a clutch spring adapted to grip said element to arrest movement thereof in said one direction so as to prevent said vehicle from moving downhill, and means for causing said spring to release its grip on said element comprising a ratchet member fixed to said spring, and a movable pawl engageable with the teeth of said ratchet member for moving the same and a part of said spring so as to cause said spring to release its grip on said element.

49. In combination with the drive system of a motor vehicle having a shaft operatively connected with the road wheels of the vehicle, a mechanism operatively associated with said shaft and operable for preventing downhill movement of said vehicle when it is facing uphill on an incline, said mechanism comprising an element adapted to be rotated in at least one direction with said shaft when the vehicle tends to move downhill, a friction band adapted to grip said element to arrest movement thereof in said one direction so as to prevent said vehicle from moving downhill, and means for causing said friction band to release its grip on said element comprising a member cooperable with one end of said friction band for moving the same so as to cause said friction band to release its grip on said element, a toggle joint having one of the links thereof connected to said member for actuating the same, said toggle joint, in one position thereof holding said member in position where the friction band is operative, and upon movement to the other position thereof moving said member so as to move the end of said friction band so as to cause the same to release its grip on said element.

50. In combination with a motor vehicle transmission having a shaft operatively associated with the road wheels of the vehicle, a shifting device whereby said transmission may be set for driving said vehicle forwardly and reversely, friction band mechanism operatively associated with said shaft and cooperable therewith for preventing undesired reverse movement of the vehicle when the transmission is set in one position, for driving the vehicle forwardly, said mechanism being arranged relative to the transmission so as to be inoperable to prevent reverse movement of the vehicle when the transmission is set in a different position for driving said vehicle reversely, means operatively associated with said friction band mechanism for eliminating the frictional drag thereof on said shaft upon the rotation thereof due to forward movement of said vehicle, and means cooperable with said friction band mechanism for maintaining the same in said condition where it is inoperable to prevent reverse movement of the vehicle under conditions when the vehicle is moving rearwardly and the shifting device has been operated to change the transmission setting from said different position to said one position.

CARL F. RAUEN.